(12) United States Patent
Natori

(10) Patent No.: US 12,514,014 B2
(45) Date of Patent: Dec. 30, 2025

(54) SEMICONDUCTOR CHIP, MANUFACTURING METHOD FOR SEMICONDUCTOR CHIP, AND ELECTRONIC DEVICE

(71) Applicant: SONY SEMICONDUCTOR SOLUTIONS CORPORATION, Kanagawa (JP)

(72) Inventor: Taichi Natori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 10 days.

(21) Appl. No.: 18/548,684

(22) PCT Filed: Jan. 13, 2022

(86) PCT No.: PCT/JP2022/000835
§ 371 (c)(1),
(2) Date: Sep. 1, 2023

(87) PCT Pub. No.: WO2022/190616
PCT Pub. Date: Sep. 15, 2022

(65) Prior Publication Data
US 2024/0153978 A1 May 9, 2024

(30) Foreign Application Priority Data
Mar. 10, 2021 (JP) ................... 2021-038079

(51) Int. Cl.
*H10F 39/00* (2025.01)
*G02B 5/20* (2006.01)
*H10F 39/12* (2025.01)

(52) U.S. Cl.
CPC .......... *H10F 39/8063* (2025.01); *G02B 5/20* (2013.01); *H10F 39/024* (2025.01); *H10F 39/12* (2025.01)

(58) Field of Classification Search
None
See application file for complete search history.

(56) References Cited

FOREIGN PATENT DOCUMENTS

| | | | |
|---|---|---|---|
| JP | 63-146590 A | 6/1988 | |
| JP | 2004-240412 A | 8/2004 | |
| JP | 2007-317719 A | 12/2007 | |
| JP | 2010-109196 A | 5/2010 | |
| JP | 2013-041141 A | 2/2013 | |
| WO | 2017/094537 A1 | 6/2017 | |
| WO | WO-2018003642 A1 * | 1/2018 | ............... G02B 1/11 |
| WO | 2018/042924 A1 | 3/2018 | |

OTHER PUBLICATIONS

International Search Report and Written Opinion of PCT Application No. PCT/JP2022/000835, issued on Mar. 29, 2022, 12 pages of ISRWO.

\* cited by examiner

*Primary Examiner* — Phu Vu
(74) *Attorney, Agent, or Firm* — CHIP LAW GROUP

(57) ABSTRACT

Provided is a semiconductor chip that includes a solid-state imaging element and a cholesteric liquid crystal layer. The cholesteric liquid crystal layer is provided on a side from which light is incident with respect to the solid-state imaging element. The cholesteric liquid crystal layer is formed by cholesteric liquid crystal.

13 Claims, 26 Drawing Sheets

SEMICONDUCTOR CHIP, MANUFACTURING METHOD FOR SEMICONDUCTOR CHIP, AND ELECTRONIC DEVICE

CROSS REFERENCE TO RELATED APPLICATIONS

This application is a U.S. National Phase of International Patent Application No. PCT/JP2022/000835 filed on Jan. 13, 2022, which claims priority benefit of Japanese Patent Application No. JP 2021-038079 filed in the Japan Patent Office on Mar. 10, 2021. Each of the above-referenced applications is hereby incorporated herein by reference in its entirety.

TECHNICAL FIELD

The present technology relates to a semiconductor chip, a manufacturing method for the semiconductor chip, and an electronic device, and particularly relates to a semiconductor chip capable of improving image quality of a captured image, a manufacturing method for the semiconductor chip, and an electronic device.

BACKGROUND ART

As a complementary metal oxide semiconductor (CMOS) image sensor, for example, there is a stacked CMOS image sensor configured by stacking a first semiconductor substrate on which a pixel region, which includes a pixel unit performing photoelectric conversion of each pixel and disposed two-dimensionally, is formed and a second semiconductor substrate on which a logic circuit processing a pixel signal output from the pixel unit is formed.

Furthermore, there is a semiconductor chip in which a glass for protecting an on-chip lens is formed on the on-chip lens of a CMOS image sensor via a seal resin or the like (for example, refer to Patent Document 1).

CITATION LIST

Patent Document

Patent Document 1: WO 2017/094537 A

SUMMARY OF THE INVENTION

Problems to be Solved by the Invention

In such a semiconductor chip, it is desired to sufficiently suppress occurrence of flare, ghost, color unevenness, and the like in a captured image and to improve image quality of the captured image.

The present technology has been made in view of such a situation, and an object of the present technology is to improve image quality of a captured image.

Solutions to Problems

According to a first aspect of the present technology, there is provided a semiconductor chip including: an imaging element; and a liquid crystal layer provided on a side from which light is incident with respect to the imaging element.

According to a second aspect of the present technology, there is provided a manufacturing method for a semiconductor chip including: forming an imaging element; and forming a liquid crystal layer on a side from which light is incident with respect to the imaging element.

According to a third aspect of the present technology, there is provided an electronic device including: a semiconductor chip including an imaging element, and a liquid crystal layer provided on a side from which light is incident with respect to the imaging element; and a signal processing circuit configured to process a signal from the semiconductor chip.

In the first aspect of the present technology, the imaging element is provided, and the liquid crystal layer is provided on a side from which light is incident with respect to the imaging element.

In the second aspect of the present technology, the imaging element is formed, and the liquid crystal layer is formed on a side from which light is incident with respect to the imaging element.

In the third aspect of the present technology, the semiconductor chip includes: the imaging element; and the liquid crystal layer provided on a side from which light is incident with respect to the imaging element, and the signal processing circuit processes a signal from the semiconductor chip.

Each of the semiconductor chip and the electronic device may be an independent device or a module incorporated in another device.

MODE FOR CARRYING OUT THE INVENTION

Figure 1:
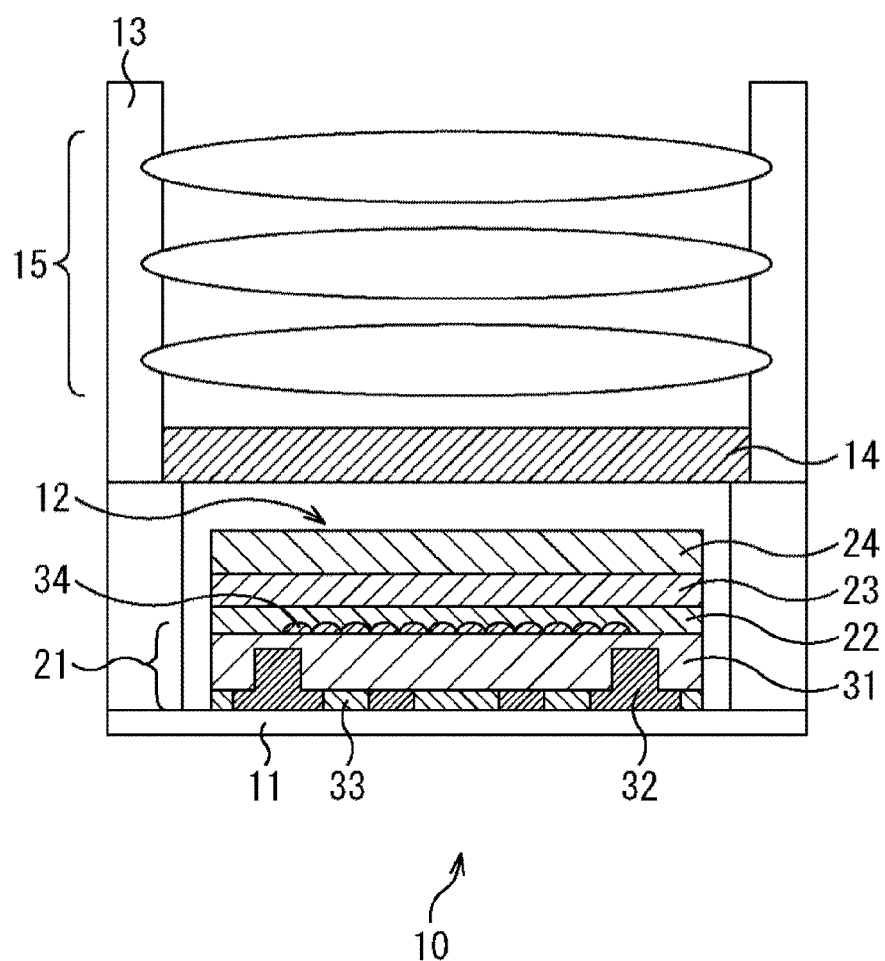
FIG. 1 is a diagram illustrating a configuration example of a camera module including a first configuration example of a first embodiment of a semiconductor chip to which the present technology is applied.

Hereinafter, a mode for carrying out the present technology (hereinafter, referred to as an embodiment) is described. Note that the description will be made in the following order.
1. First Embodiment of Semiconductor Chip
2. Second Embodiment of Semiconductor Chip
3. Third Embodiment of Semiconductor Chip
4. Application Example to Electronic Device
5. Usage Example of Semiconductor Chip
6. Application Example to Endoscopic Surgery System
7. Application Example to Mobile Body Note that in the drawings referred to in the following description, the same or similar portions are denoted by the same or similar reference numerals. However, the drawings are schematic, and the relationship between the thickness and the plane dimension, the ratio of the thickness of each layer, and the like are different from the actual ones. Furthermore, the drawings may include portions having different dimensional relationships and ratios.

Furthermore, definitions of directions such as up and down in the following description are merely definitions for convenience of description, and do not limit the technical idea of the present disclosure. For example, when an object is rotated by 90° to be observed, the upper and lower sides are changed as the left and right sides, and when the object is rotated by 180°, the upper and lower sides are reversed.

1. First Embodiment of Semiconductor Chip

Configuration Example of Camera Module

FIG. 1 is a diagram illustrating a configuration example of a camera module including a first configuration example of a first embodiment of a semiconductor chip to which the present technology is applied.

In a camera module 10 of FIG. 1, a semiconductor chip 12 is provided on a support substrate 11, and a lens holder 13 is provided so as to surround the periphery of the semiconductor chip 12. The lens holder 13 supports a cover glass 14 and a lens group 15 such that the cover glass 14 is disposed above the semiconductor chip 12 (side on which light is incident) and the lens group 15 is disposed above the cover glass 14. An infrared (IR) cut filter of a multilayer film is added to the cover glass 14. The lens group 15 includes one or more (three in the example of FIG. 1) lenses.

The semiconductor chip 12 is a packaged solid-state imaging device, for example, a solid-state imaging device having a wafer level chip size package (WCSP) structure. In the semiconductor chip 12, a cholesteric liquid crystal layer 23 is adhered to the upper side (side on which light is incident) of a solid-state imaging element 21 via the adhesive 22. A glass substrate 24 is provided on the upper side (side on which light is incident) of the cholesteric liquid crystal layer 23.

The solid-state imaging element 21 is a back-illumination CMOS image sensor. In the solid-state imaging element 21, a wiring 32 is formed on the lower side (side installed on the support substrate 11) of a semiconductor substrate 31 such as a silicon substrate, and a solder resist 33 is applied to a region of the lower side of the semiconductor substrate 31 where the wiring 32 is not formed. The wiring 32 is connected to a wiring (not illustrated) on the support substrate 11, and exchanges signals with a circuit (not illustrated) outside the camera module 10. The semiconductor substrate 31 has a pixel region in which a pixel unit including a photodiode as a photoelectric conversion unit of each pixel is disposed two-dimensionally. On the upper side of the pixel region of the semiconductor substrate 31, an on-chip lens 34 is provided corresponding to each pixel unit.

Light incident on the camera module 10 is condensed by the lens group 15 and is incident on the cover glass 14. Transmission of infrared light among the light incident on the cover glass 14 is suppressed by an IR cut filter added to the cover glass 14. The light transmitted through the IR cut filter is incident on the semiconductor chip 12. The light incident on the semiconductor chip 12 is incident on a photodiode (not illustrated) provided on the semiconductor substrate 31 via the glass substrate 24, the cholesteric liquid crystal layer 23, the adhesive 22, and the on-chip lens 34. The light incident on the photodiode is converted into an electric signal by photoelectric conversion, and thus imaging is performed. An image signal obtained as a result of the imaging is output to the outside of the camera module 10 via the wiring 32.

Description of Cholesteric Liquid Crystal Layer

The cholesteric liquid crystal layer 23 in FIG. 1 will be described with reference to FIG. 2 and FIG. 3.

Figure 2:
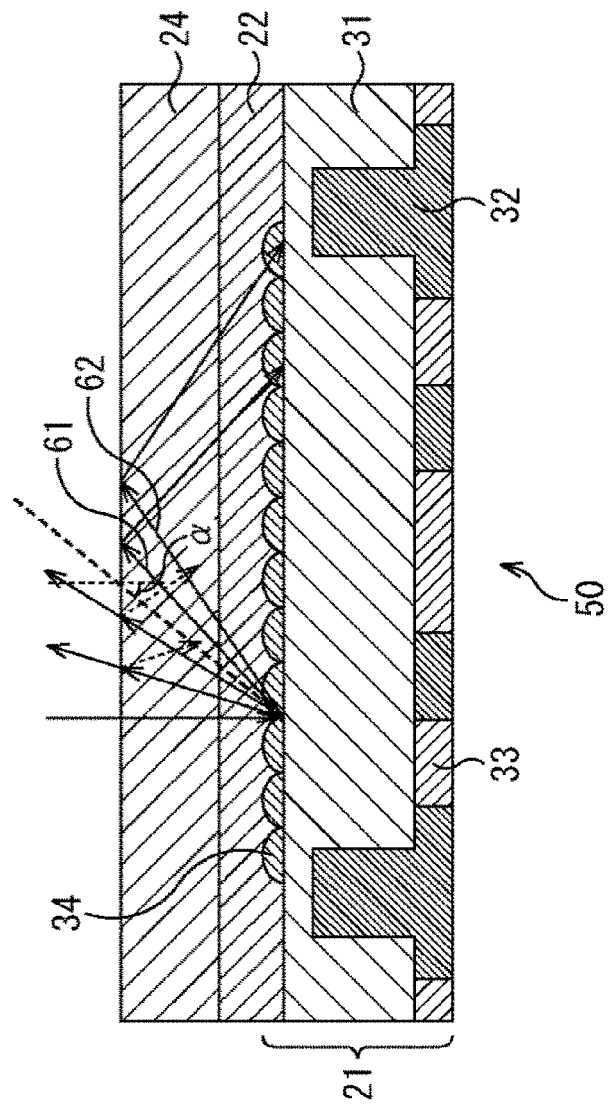
FIG. 2 is a diagram illustrating a semiconductor chip in a case where a cholesteric liquid crystal layer is not provided.

FIG. 2 is a diagram illustrating a semiconductor chip in a case where the cholesteric liquid crystal layer 23 is not provided in the semiconductor chip 12 of FIG. 1. In this case, among the light incident on a semiconductor chip 50 in FIG. 2, a diffracted component of the light reflected by the surface on the upper side of the pixel region of the solid-state imaging element 21 (hereinafter, referred to as a sensor surface) is reflected by the surface of the glass substrate 24 (interface between the glass substrate 24 and air). At this time, light (for example, light indicated by arrows 61 and 62 in FIG. 2) incident on the surface of the glass substrate 24 at an angle equal to or larger than the critical angle α (for example, 41.5 degrees) is totally reflected and incident on the sensor surface again. As a result, flare having a ring shape or the like occurs in the captured image. By increasing the thickness of the glass substrate 24, it is possible to prevent reflected light from the sensor surface from being incident on the sensor surface again, but the height of the semiconductor chip 50 is increased, which hinders reduction in the height of the camera module including the semiconductor chip 50. Therefore, it is difficult to reduce the occurrence of flare while suppressing the increase in height of the semiconductor chip 50.

Figure 3:
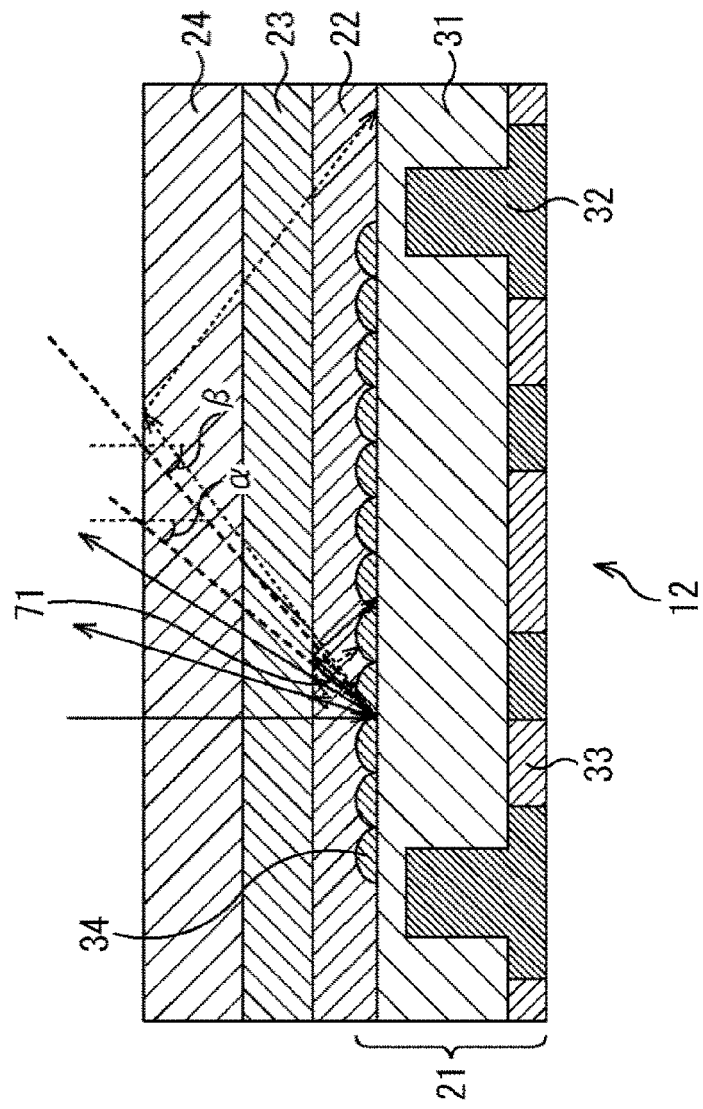
FIG. 3 is a diagram for explaining a cholesteric liquid crystal layer.

On the other hand, as illustrated in FIG. 3, in the semiconductor chip 12 provided with the cholesteric liquid crystal layer 23, among the light incident on the semiconductor chip 12 and reflected by the sensor surface of the solid-state imaging element 21, light (for example, light indicated by arrow 71 in FIG. 3) in a range in which the incident angle on the glass substrate 24 is larger than an angle in the vicinity of the critical angle α and reaches an angle β larger than the critical angle α by a predetermined angle (hereinafter, referred to as a critical angle range) is reflected by the lower surface of the cholesteric liquid crystal layer 23. For example, the angle β can be set such that light of which the incident angle on the glass substrate 24 is larger than the angle β and which is reflected from the glass substrate 24 is incident on a surface other than the pixel region of the solid-state imaging element 21 again.

Specifically, the cholesteric liquid crystal layer 23 is formed by cholesteric liquid crystal. The cholesteric liquid crystal has a layered structure in which a large amount of rod-shaped molecules are overlapped with each other, and the layers are integrated such that the arrangement direction of the molecules is spiral. A normal cholesteric liquid crystal has a spiral axis in the vertical direction of a substrate on which the cholesteric liquid crystal is formed, and can reflect circularly polarized light in the same direction as the spiral winding direction. Therefore, in the semiconductor chip 12, by adjusting the axial direction of the spiral axis of the cholesteric liquid crystal layer 23, the molecular arrangement of each layer, and the like, light in the critical angle range among the light (polarized light) reflected by the sensor surface can be reflected by the lower surface of the cholesteric liquid crystal layer 23. The critical angle range is, for example, a range in which the incident angle on the glass substrate 24 ranges from 40 degrees to 50 degrees.

As described above, in the semiconductor chip 12, since light in the critical angle range is reflected by the lower surface of the cholesteric liquid crystal layer 23, this light is incident on the vicinity of the light source again. As a result, the flare generated by the light incident again can be made indistinguishable from a light source image. Furthermore, since light in the critical angle range is not transmitted through the cholesteric liquid crystal layer 23, the occurrence of flare due to this light totally reflected by the glass substrate 24 can be prevented. Moreover, in a case where the angle β is set such that light of which the incident angle is larger than the angle β of the upper limit of the critical angle range and which is reflected from the glass substrate 24 is incident on a surface other than the pixel region of the solid-state imaging element 21 again, the occurrence of the flare due to light of which the incident angle is larger than the critical angle range and which is reflected from the glass substrate 24 can also be prevented.

Note that the cholesteric liquid crystal is a type of nematic liquid crystal, and similarly to a general liquid crystal, a substance existing in a state between crystal and liquid and in a state in which molecular directions are regularly aligned is used as a liquid crystal material. Examples of the liquid crystal material of the cholesteric liquid crystal include general liquid crystal materials such as a cyanobiphenyl-based liquid crystal material, a cyanophenylcyclohexane-based liquid crystal material, an ester-based liquid crystal material, an alkenyl-based liquid crystal material, a fluorine-based liquid crystal material, and a polyfluorine-based liquid crystal material.

Figure 4:
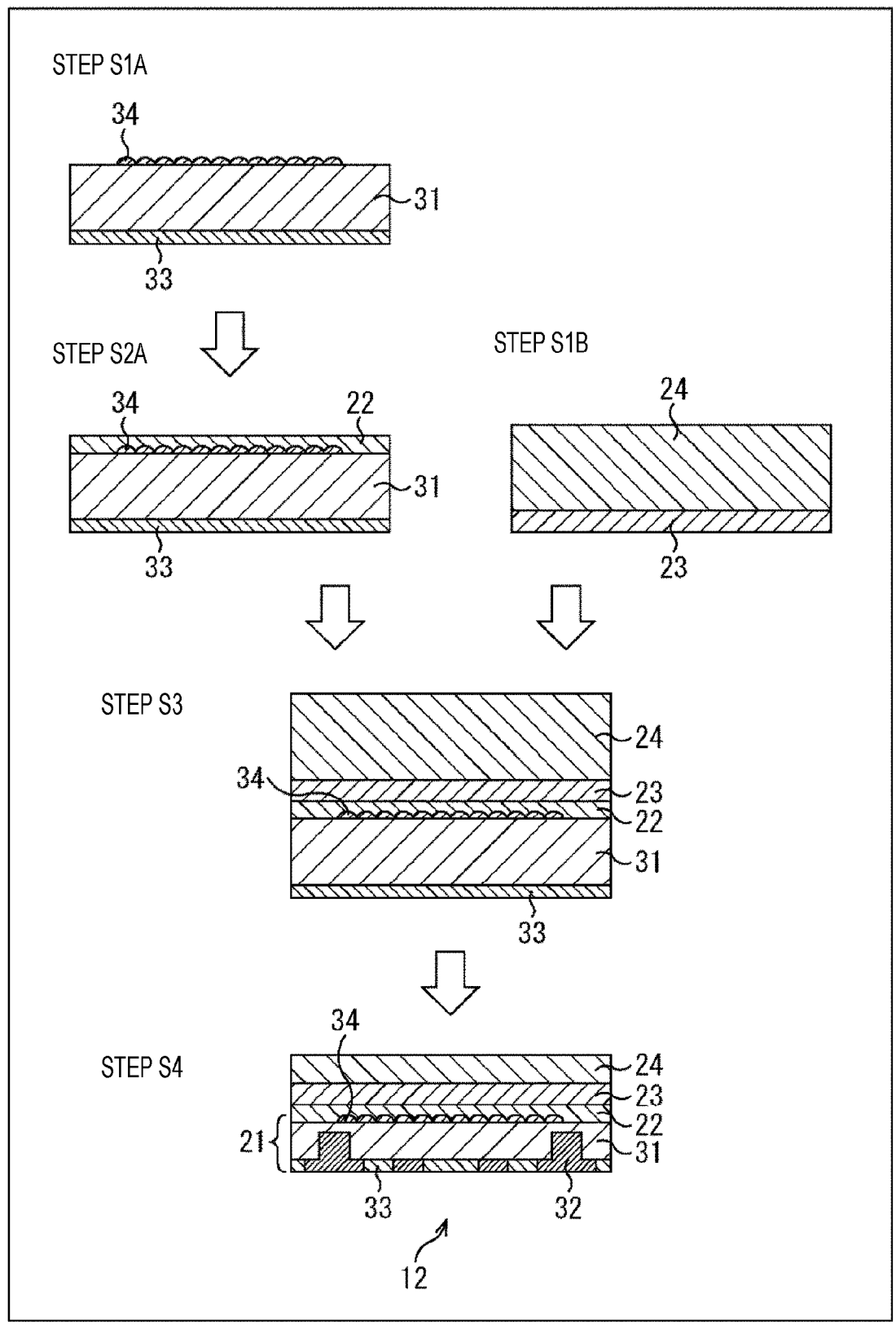
FIG. 4 is a diagram for explaining a first example of a manufacturing method for a semiconductor chip.

First Example of Manufacturing Method of First Configuration Example of First Embodiment of Semiconductor Chip FIG. 4 is a diagram for explaining a first example of a manufacturing method for the semiconductor chip 12 of FIG. 1.

The entire steps of FIG. 4 are performed in a unit of a wafer-like semiconductor substrate 31 on which one or more semiconductor chips 12 are formed, but in FIG. 4, for convenience of description, only a region of one semiconductor chip 12 among one or more semiconductor chips 12 formed from the wafer-like semiconductor substrate 31 is illustrated. The same applies to FIG. 5 to be described later.

In step S1A, the solder resist 33 is formed on the lower side of the wafer-like semiconductor substrate 31 having the pixel region, and the solid-state imaging element 21, of which the on-chip lens 34 is formed on the upper side and on which the wiring 32 is not formed yet, is formed. Next, in step S2A, the adhesive 22 is applied to the upper side of the semiconductor substrate 31.

On the other hand, in step S1B, the cholesteric liquid crystal layer 23 is formed on the lower side of the glass substrate 24.

In step S3, the semiconductor substrate 31 and the cholesteric liquid crystal layer 23 formed in step S1B are adhered via the adhesive 22 applied to the semiconductor substrate 31 in step S2A. As a result, the cholesteric liquid crystal layer 23 is formed on the upper side (light incident side) of the solid-state imaging element 21 on which the wiring 32 is not yet formed.

Finally, in step S4, the semiconductor substrate 31 is thinned, and the wiring 32 is formed on the lower side (back surface side) of the semiconductor substrate 31. Then, the glass substrate 24 is polished and division into individual pieces is performed to form the semiconductor chip 12.

Figure 5:
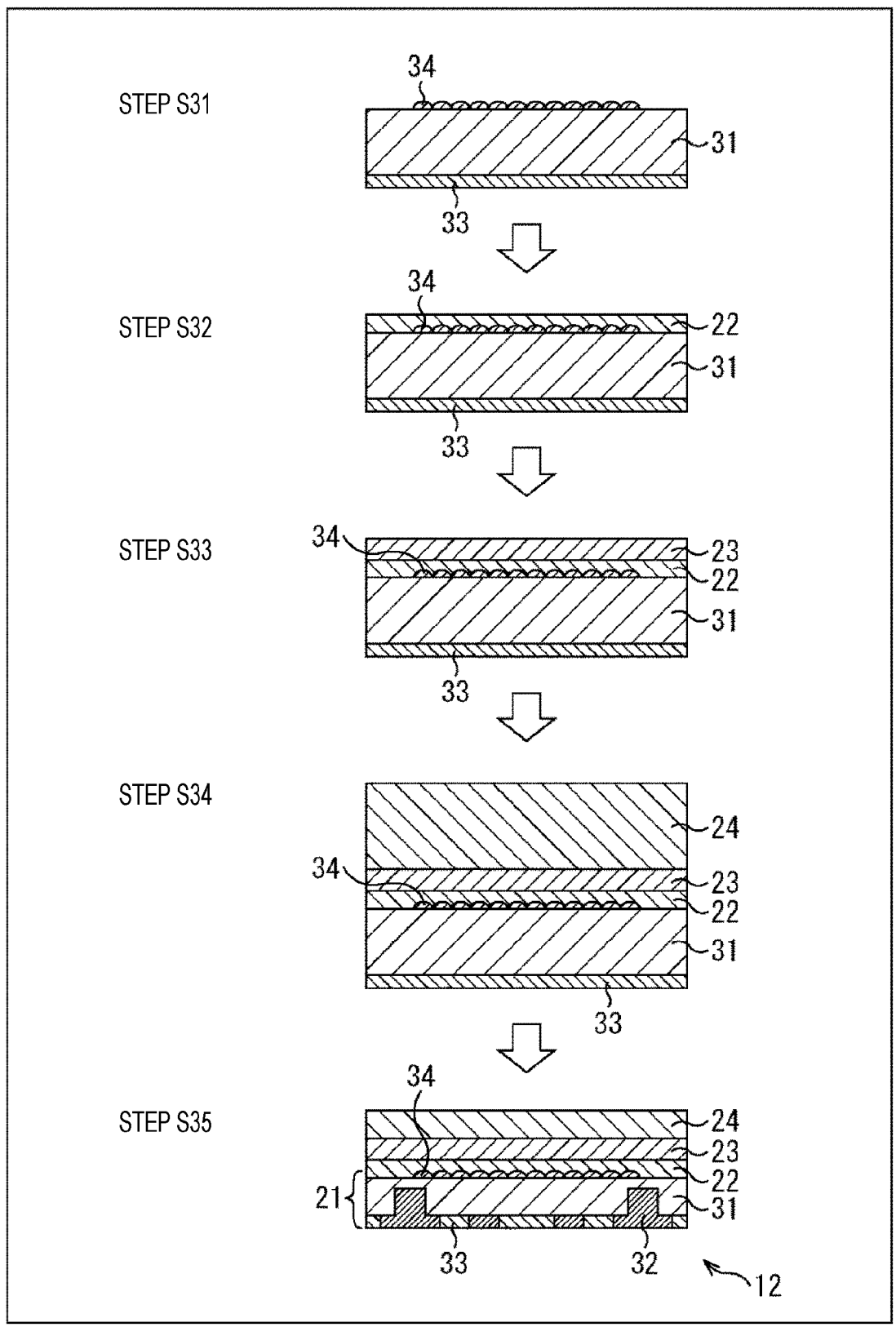
FIG. 5 is a diagram for explaining a second example of a manufacturing method for a semiconductor chip.

Second Example of Manufacturing Method of First Configuration Example of First Embodiment of Semiconductor Chip FIG. 5 is a diagram for explaining a second example of a manufacturing method for the semiconductor chip 12 of FIG. 1.

Since step S31 and step S32 in FIG. 5 are similar to step S1A and step S2A in FIG. 4, the description thereof will be omitted.

In step S33, the cholesteric liquid crystal layer 23 is formed on the adhesive 22 applied to the semiconductor substrate 31 in step S32. As a result, the cholesteric liquid crystal layer 23 is formed on the upper side (light incident side) of the solid-state imaging element 21 on which the wiring 32 is not yet formed.

In step S34, the glass substrate 24 is adhered onto the cholesteric liquid crystal layer 23. Finally, in step S35, as in step S4 of FIG. 4, the semiconductor substrate 31 is thinned, and the wiring 32 is formed on the lower side of the semiconductor substrate 31. Then, the glass substrate 24 is polished and division into individual pieces is performed to form the semiconductor chip 12.

Second Configuration Example of First Embodiment of Semiconductor Chip

Figure 6:
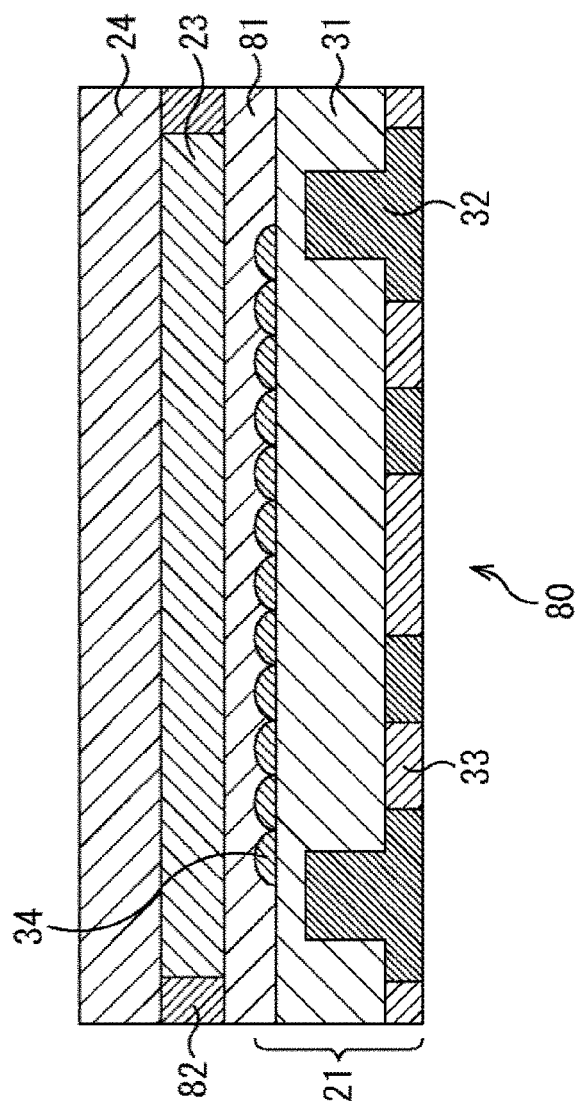
FIG. 6 is a diagram illustrating a second configuration example of the first embodiment of a semiconductor chip to which the present technology is applied.

FIG. 6 is a diagram illustrating a second configuration example of the first embodiment of the semiconductor chip to which the present technology is applied.

In FIG. 6, a portion corresponding to that in FIG. 1 is assigned with the same reference sign and the detailed description of the portion will be omitted.

As illustrated in FIG. 6, a semiconductor chip 80 is different from the semiconductor chip 12 in FIG. 1 in that a flat layer 81 is provided instead of the adhesive 22, and a spacer 82 is provided along the outer periphery of the semiconductor chip 80 on the flat layer 81.

Specifically, in the semiconductor chip 80, the flat layer 81 is formed on the upper side (light incident side) of the solid-state imaging element 21. Furthermore, the cholesteric liquid crystal layer 23 is formed on an inner side of the spacer 82 formed along the outer periphery of the semiconductor chip 80 on the flat layer 81.

Note that although not illustrated, the configuration of the camera module including the semiconductor chip 80 is, for example, a configuration in which the semiconductor chip 12 of the camera module 10 in FIG. 1 is replaced with the semiconductor chip 80.

Figure 7:
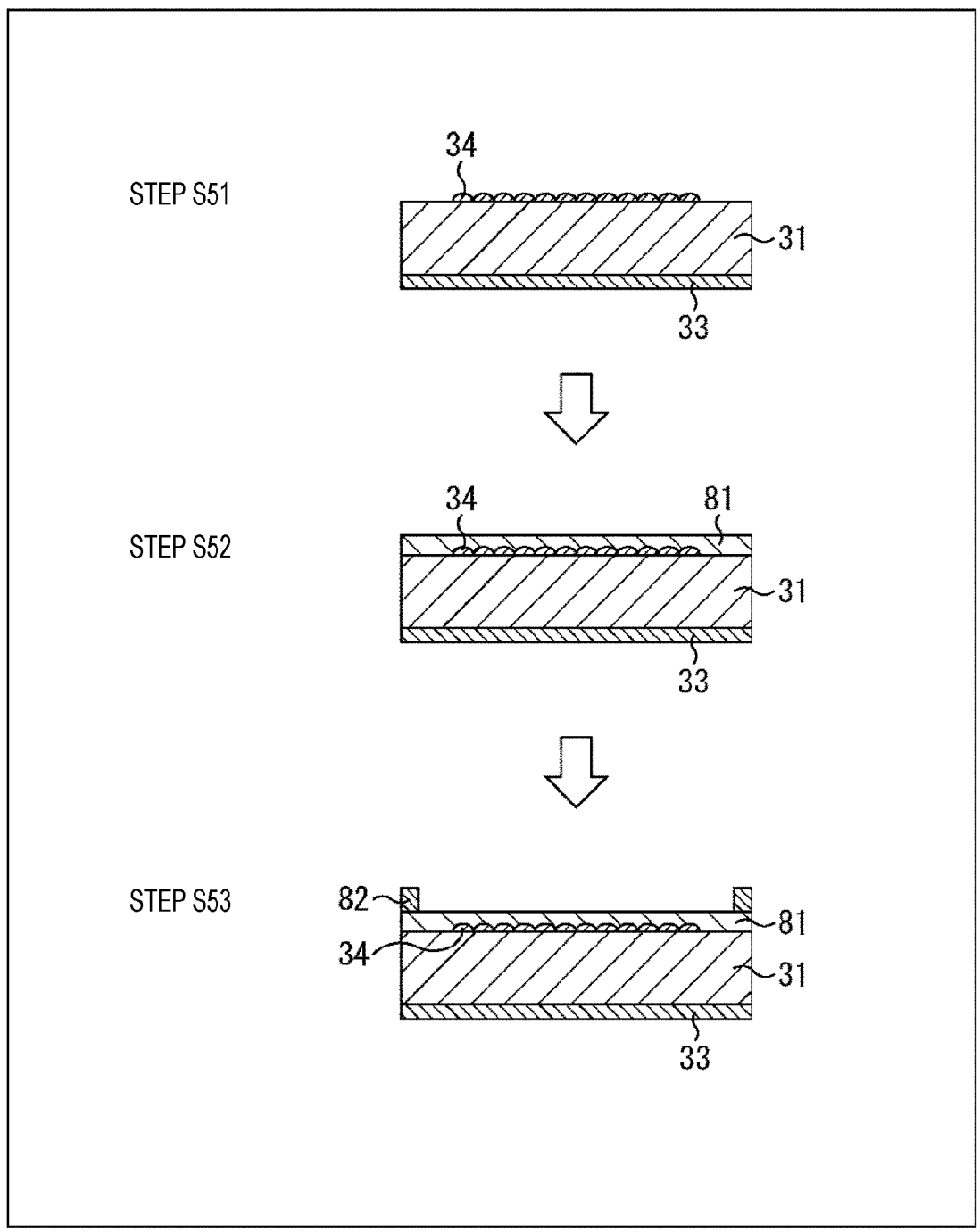
FIG. 7 is a diagram for explaining an example of a manufacturing method for a semiconductor chip.
Figure 8:
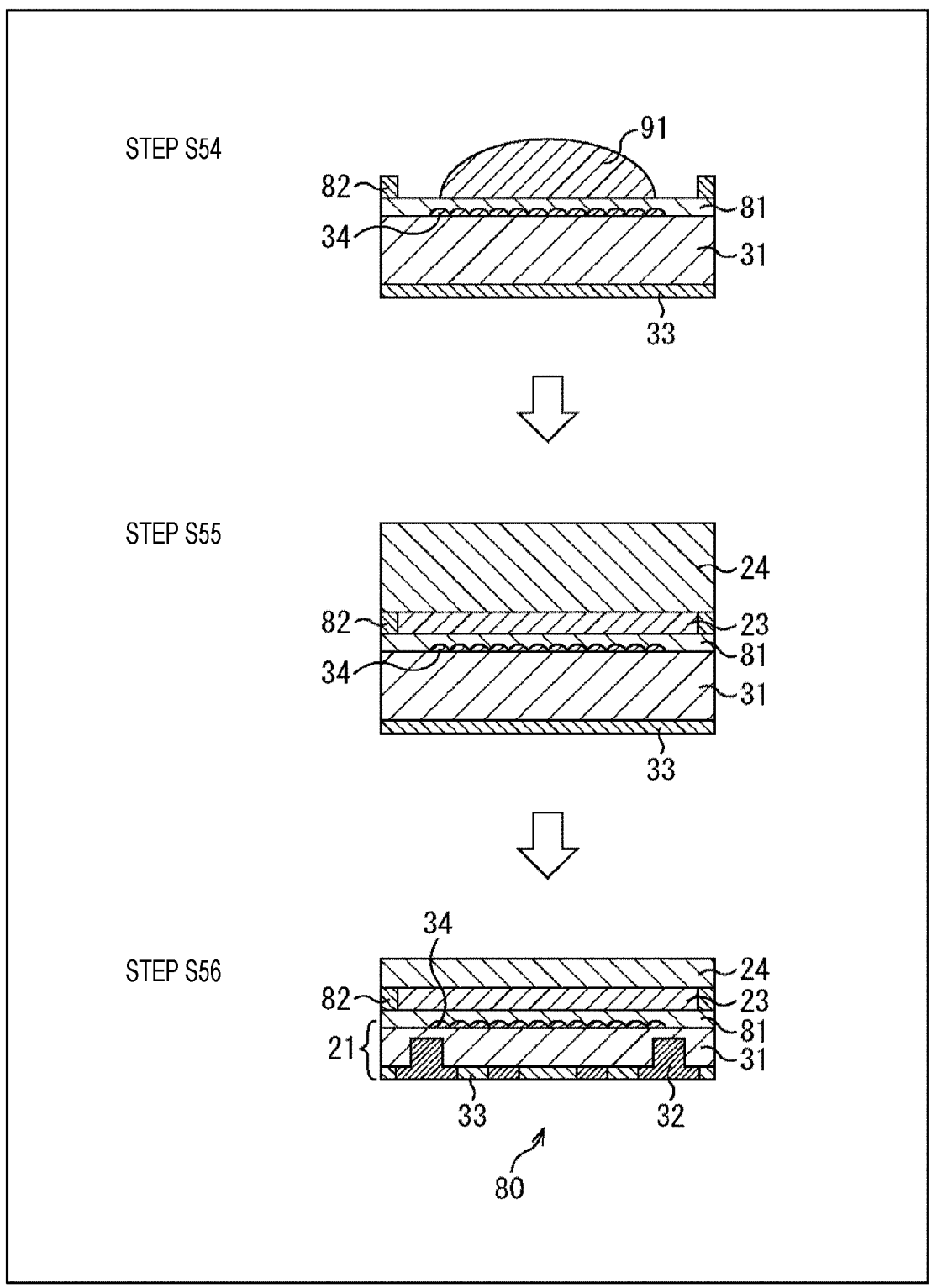
FIG. 8 is a diagram for explaining an example of a manufacturing method for a semiconductor chip.

Example of Manufacturing Method of Second Configuration Example of First Embodiment of Semiconductor Chip FIG. 7 and FIG. 8 are diagrams for explaining an example of a manufacturing method for the semiconductor chip 80 of FIG. 6.

The entire steps of FIG. 7 and FIG. 8 are performed in a unit of a wafer-like semiconductor substrate 31 on which one or more semiconductor chips 80 are formed, but in FIG. 7 and FIG. 8, for convenience of description, only a region of one semiconductor chip 80 among one or more semiconductor chips 80 formed from the wafer-like semiconductor substrate 31 is illustrated.

In step S51 of FIG. 7, the solder resist 33 is formed on the lower side of the wafer-like semiconductor substrate 31 having the pixel region, and the solid-state imaging element 21, of which the on-chip lens 34 is formed on the upper side and on which the wiring 32 is not formed yet, is formed. Next, in step S52, the flat layer 81 is formed on the solid-state imaging element 21 on which the wiring 32 is not yet formed. In step S53, the spacer 82 is formed along the outer periphery of the semiconductor chip 80 on the flat layer 81 formed in step S52.

In step S54 in FIG. 8, a cholesteric liquid crystal 91 for forming the cholesteric liquid crystal layer 23 is dropped on the inner side of the spacer 82 on the flat layer 81. In step S55, the glass substrate 24 is adhered onto the spacer 82, and thus the cholesteric liquid crystal layer 23 is formed between the glass substrate 24 and the flat layer 81. Finally, in step S56, as in step S4 of FIG. 4, the semiconductor substrate 31 is thinned, and the wiring 32 is formed on the lower side of the semiconductor substrate 31. Then, the glass substrate 24 is polished and division into individual pieces is performed to form the semiconductor chip 80.

Third Configuration Example of First Embodiment of Semiconductor Chip

Figure 9:
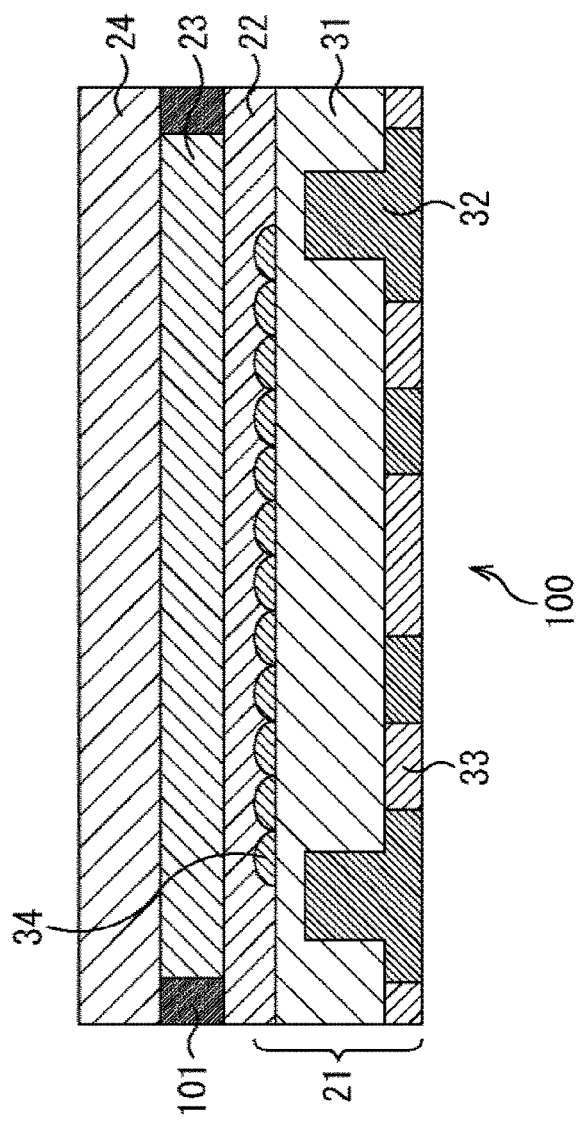
FIG. 9 is a diagram illustrating a third configuration example of the first embodiment of a semiconductor chip to which the present technology is applied.

FIG. 9 is a diagram illustrating a third configuration example of the first embodiment of the semiconductor chip to which the present technology is applied.

In FIG. 9, a portion corresponding to that in FIG. 1 is assigned with the same reference sign and the detailed description of the portion will be omitted.

As illustrated in FIG. 9, a semiconductor chip 100 is different from the semiconductor chip 12 in FIG. 1 in that a light absorption layer 101 is formed along the outer periphery of the semiconductor chip 100 on the adhesive 22.

Specifically, in the semiconductor chip 100, the cholesteric liquid crystal layer 23 is formed on an inner side of the light absorption layer 101 formed along the outer periphery of the semiconductor chip 100 on the adhesive 22 on the upper side (light incident side) of the solid-state imaging element 21. Thus, it is possible to prevent light from being reflected by the end surface of the semiconductor chip 100 and being incident on the sensor surface of the solid-state imaging element 21. Therefore, it is possible to capture a high-quality image with less flare and ghost.

Note that although not illustrated, the configuration of the camera module including the semiconductor chip 100 is, for example, a configuration in which the semiconductor chip 12 of the camera module 10 in FIG. 1 is replaced with the semiconductor chip 100.

Fourth Configuration Example of First Embodiment of Semiconductor Chip

Figure 10:
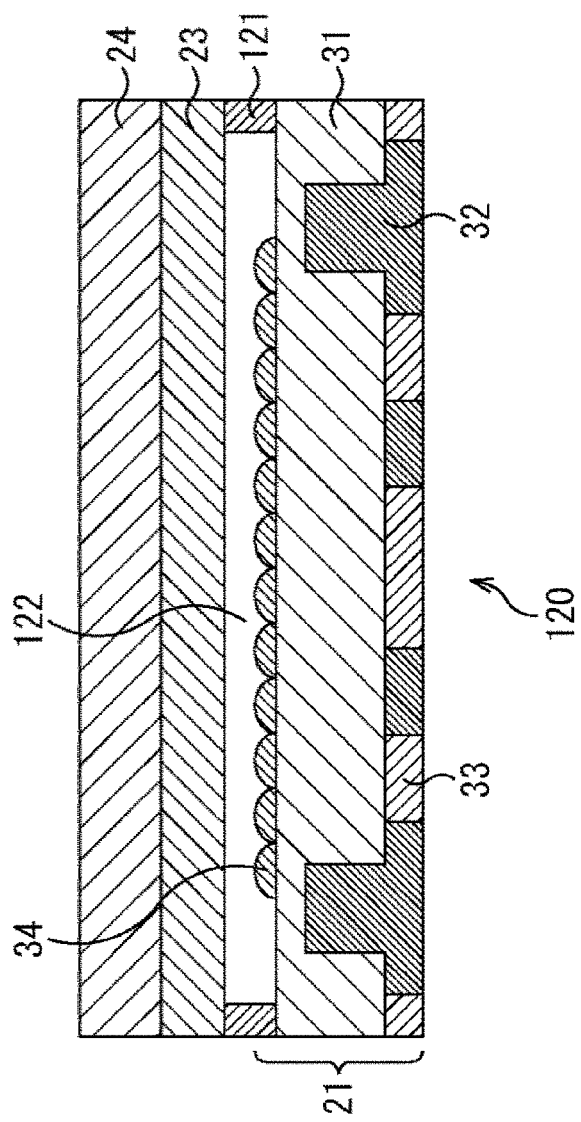
FIG. 10 is a diagram illustrating a fourth configuration example of the first embodiment of a semiconductor chip to which the present technology is applied.

FIG. 10 is a diagram illustrating a fourth configuration example of the first embodiment of the semiconductor chip to which the present technology is applied.

In FIG. 10, a portion corresponding to that in FIG. 1 is assigned with the same reference sign and the detailed description of the portion will be omitted.

As illustrated in FIG. 10, a semiconductor chip 120 is different from the semiconductor chip 12 in FIG. 1 in that an adhesive 121 is formed instead of the adhesive 22.

Specifically, in the semiconductor chip 120, the adhesive 121 is not applied onto the entire solid-state imaging element 21, but is applied only to a partial region along the outer periphery of the semiconductor chip 120. That is, the adhesive 121 is formed along the outer periphery of the semiconductor chip 120 between the semiconductor substrate 31 and the cholesteric liquid crystal layer 23, and a space (cavity) 122 is formed on an inner side of the adhesive 121.

Note that although not illustrated, the configuration of the camera module including the semiconductor chip 120 is, for example, a configuration in which the semiconductor chip 12 of the camera module 10 in FIG. 1 is replaced with the semiconductor chip 120.

As described above, the first embodiment of the semiconductor chip to which the present technology is applied includes the solid-state imaging element 21 and the cholesteric liquid crystal layer 23 provided on the light incident side with respect to the solid-state imaging element 21, and thus the image quality of the captured image can be improved.

Specifically, the lower surface of the cholesteric liquid crystal layer 23 reflects light in the critical angle range among the light reflected from the sensor surface of the solid-state imaging element 21. Thus, light in the critical angle range is incident on the sensor surface again in the vicinity of the light source, which causes occurrence of flare, and the flare cannot be distinguished from the light source image. Therefore, the image quality of the captured image can be improved.

Furthermore, in a case where the angle 3 is set such that light of which the incident angle is larger than the angle 3 of the upper limit of the critical angle range and which is reflected from the glass substrate 24 is incident on a surface other than the pixel region of the solid-state imaging element 21 again, the occurrence of flare due to light of which the incident angle is larger than the critical angle range and which is reflected from the glass substrate 24 can also be prevented. As a result, the image quality of the captured image is improved.

2. Second Embodiment of Semiconductor Chip

Configuration Example of Camera Module

Figure 11:
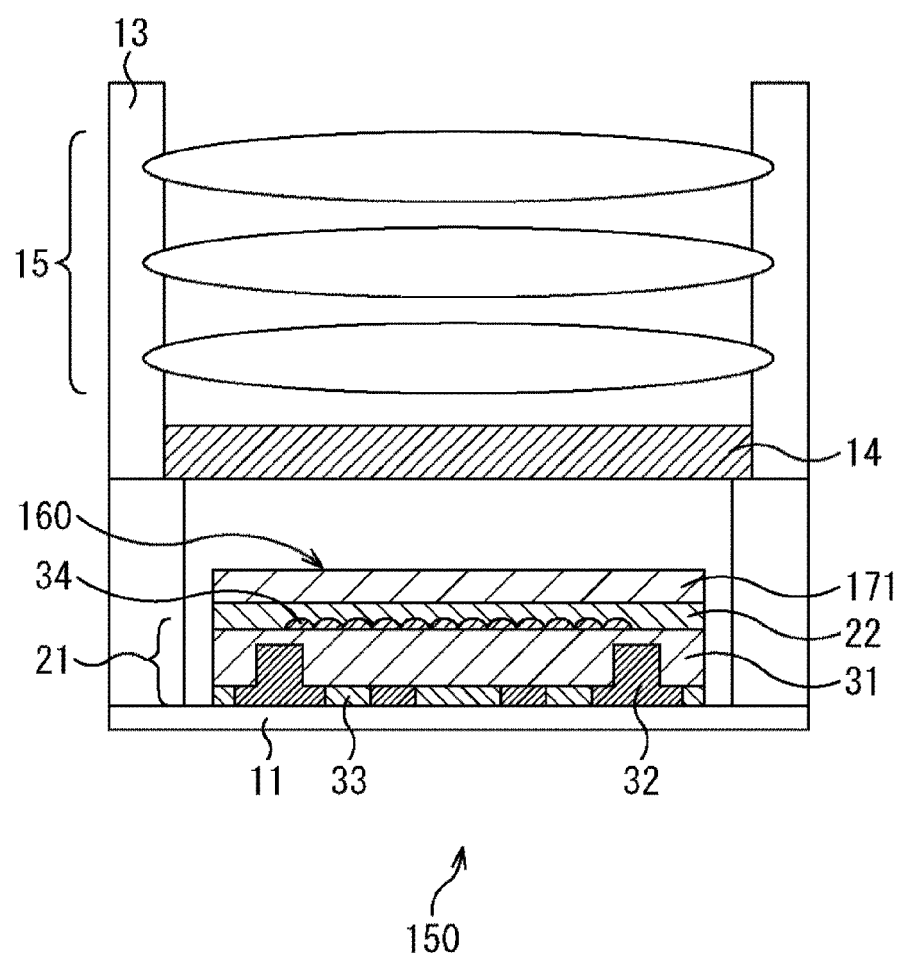
FIG. 11 is a diagram illustrating a configuration example of a camera module including a first configuration example of a second embodiment of a semiconductor chip to which the present technology is applied.

FIG. 11 is a diagram illustrating a configuration example of a camera module including a first configuration example of a second embodiment of the semiconductor chip to which the present technology is applied.

In FIG. 11, a portion corresponding to that in FIG. 1 is assigned with the same reference sign and the detailed description of the portion will be omitted.

A camera module 150 in FIG. 11 is different from the camera module 10 in FIG. 1 in that a semiconductor chip 160 is provided instead of the semiconductor chip 12. The semiconductor chip 160 is different from the semiconductor chip 12 in FIG. 1 in that a cholesteric liquid crystal layer 171 is provided instead of the cholesteric liquid crystal layer 23 and the glass substrate 24 is not provided.

The cholesteric liquid crystal layer 171 of the semiconductor chip 160 suppresses transmission of light having a wavelength around 700 nm, which is a wavelength band of a boundary between infrared light and visible light, among light incident on the semiconductor chip 160 via the lens group 15 and the cover glass 14. That is, the cholesteric liquid crystal layer 171 reflects light having a wavelength around 700 nm.

Specifically, the cholesteric liquid crystal can prevent transmission of light having a specific wavelength by adjusting the axial direction of the spiral axis described above, the molecular arrangement of each layer, and the like. Therefore, the cholesteric liquid crystal layer 171 is formed by cholesteric liquid crystal adjusted to suppress transmission of light around 700 nm.

Description of Cholesteric Liquid Crystal Layer

The cholesteric liquid crystal layer 171 in FIG. 11 will be described with reference to FIG. 12 and FIG. 14.

Figure 12:
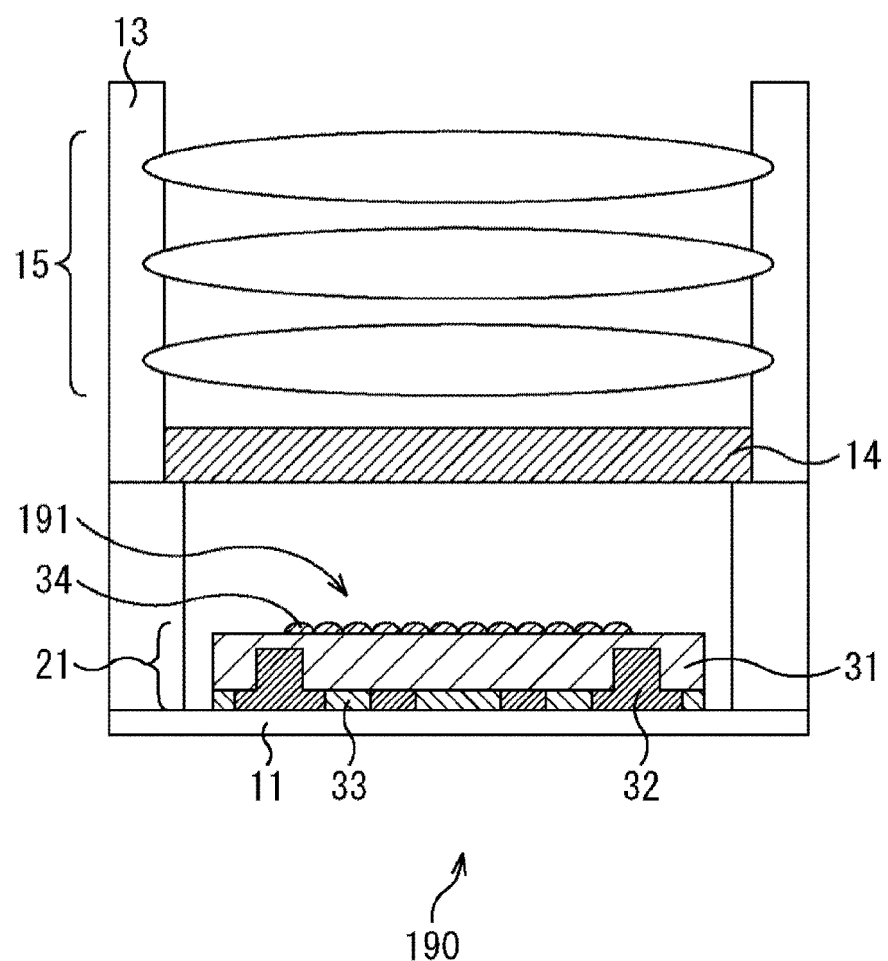
FIG. 12 is a diagram illustrating a camera module in a case where a cholesteric liquid crystal layer is not provided.
Figure 13:
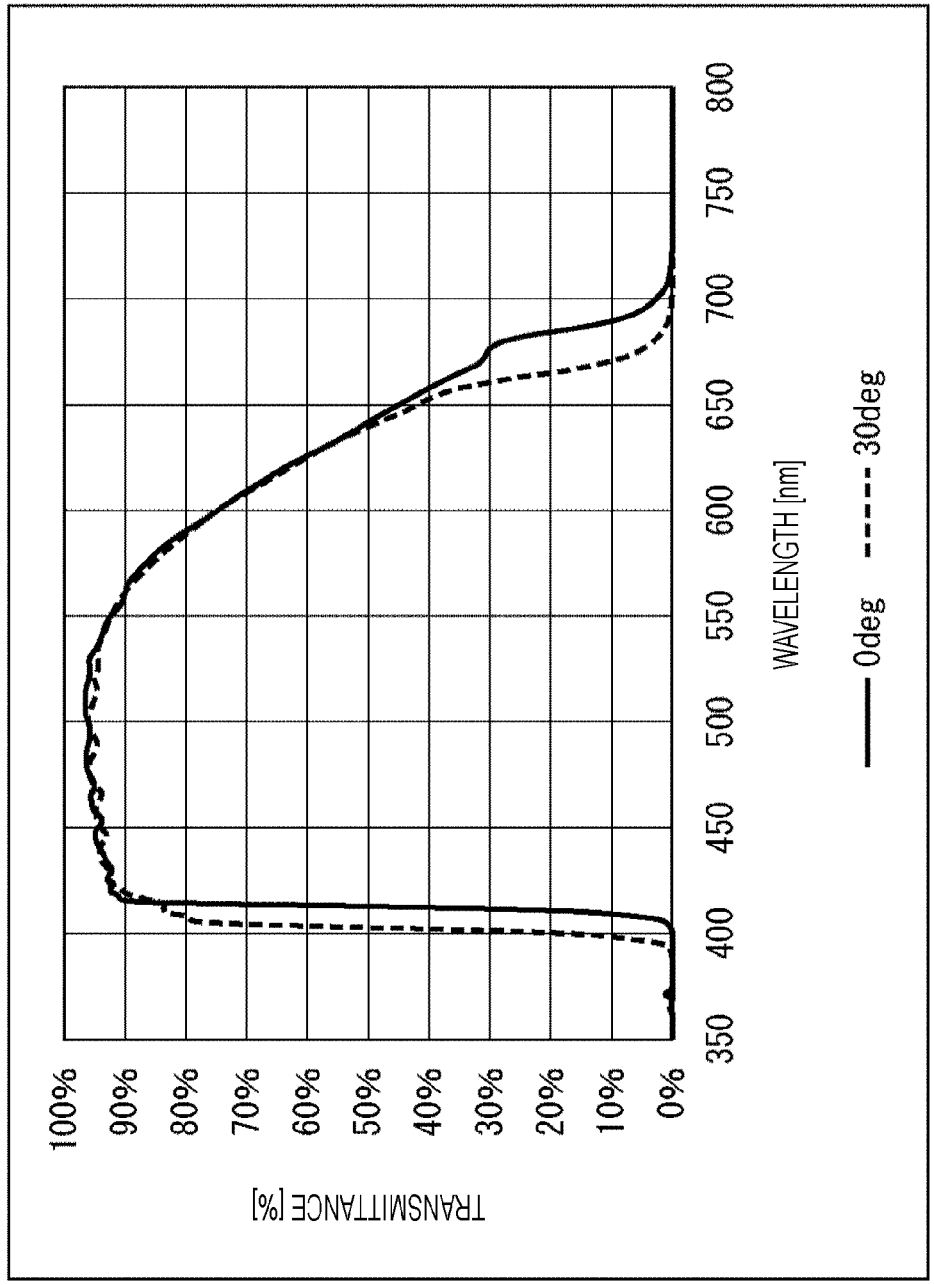
FIG. 13 is a diagram illustrating a relationship between a wavelength and transmittance of light incident on a cover glass.

FIG. 12 is a diagram illustrating a camera module in a case where the adhesive 22 and the cholesteric liquid crystal layer 171 are not provided in the semiconductor chip 160 of FIG. 11. In this case, light incident on a camera module 190 in FIG. 12 is condensed via the lens group 15 and is incident on the cover glass 14. Transmission of infrared light of the light incident on the cover glass 14 is suppressed by an IR cut filter added to the cover glass 14. FIG. 13 is a diagram illustrating a relationship between a wavelength and transmittance of light incident on the cover glass 14 at this time.

In FIG. 13, a horizontal axis represents a wavelength [nm] of light incident on the cover glass 14, and a vertical axis represents transmittance [%] of the light in the cover glass 14. Furthermore, a solid line in FIG. 13 represents a relationship between a wavelength and transmittance of light incident on the cover glass 14 and having an incident angle of zero degrees, and a dotted line represents a relationship between the wavelength and transmittance of light having an incident angle of 30 degrees.

As illustrated in FIG. 13, the IR cut filter added to the cover glass 14 suppresses transmission of infrared light having a wavelength longer than the wavelength around 700 nm, but the relationship between the wavelength and transmittance of light depends on the incident angle. As a result, ghost, color unevenness, or the like occurs in an image captured by the solid-state imaging element 21 due to the light passing through the cover glass 14 and incident on a semiconductor chip 191.

On the other hand, in the semiconductor chip 160 in FIG. 11, since the cholesteric liquid crystal layer 171 is provided, the cholesteric liquid crystal layer 171 suppresses transmission of light having a wavelength around 700 nm of the light passing through the cover glass 14 and incident on the semiconductor chip 160. FIG. 14 is a diagram illustrating a relationship between a wavelength and transmittance of light incident on the cholesteric liquid crystal layer 171 by indicating with a thick solid line.

Figure 14:
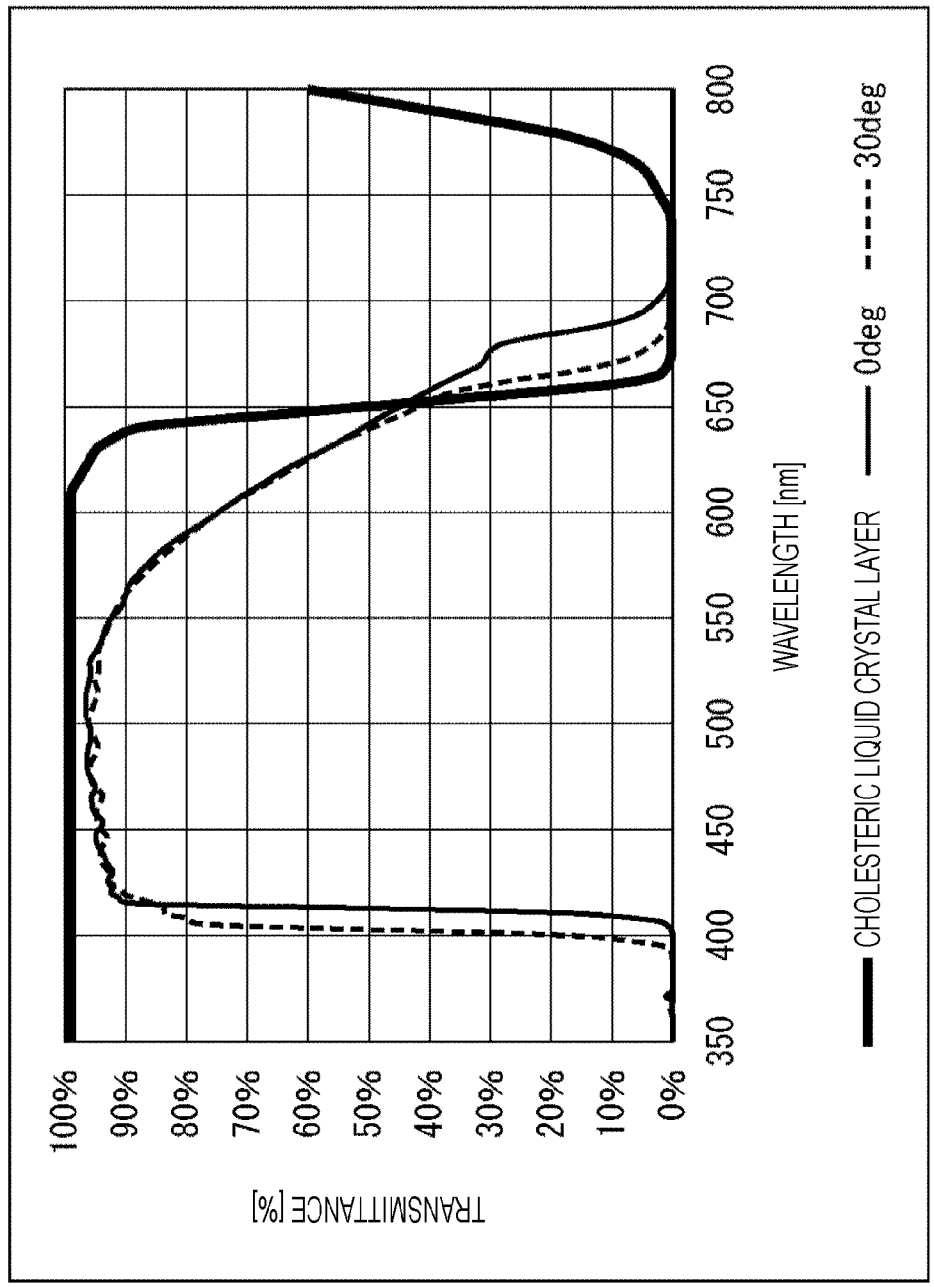
FIG. 14 is a diagram illustrating a relationship between a wavelength and transmittance of light incident on a cholesteric liquid crystal layer.

In FIG. 14, a horizontal axis represents a wavelength [nm] of light incident on the cover glass 14 or the cholesteric liquid crystal layer 171, and a vertical axis represents transmittance [%] of the light in the cover glass 14 or the cholesteric liquid crystal layer 171. As in the case of FIG. 13, a thin solid line in FIG. 14 represents a relationship between a wavelength and transmittance of light incident on the cover glass 14 and having an incident angle of zero degrees, and a dotted line represents a relationship between the wavelength and transmittance of light having an incident angle of 30 degrees.

As indicated by a thick solid line in FIG. 14, in the cholesteric liquid crystal layer 171, transmission of light having a wavelength around 700 nm of the incident light is suppressed without depending on the incident angle. Thus, it is possible to reduce the influence of variation in the relationship between a wavelength and transmittance of the incident light depending on the incident angle in the cover glass 14 as indicated by the thin solid line and dotted line in FIG. 14. As a result, the occurrence of ghost, color unevenness, or the like is suppressed in an image formed by light passing through the cover glass 14, and passing through this cholesteric liquid crystal layer 171 to be incident on the solid-state imaging element 21, and the image quality is improved.

Figure 15:
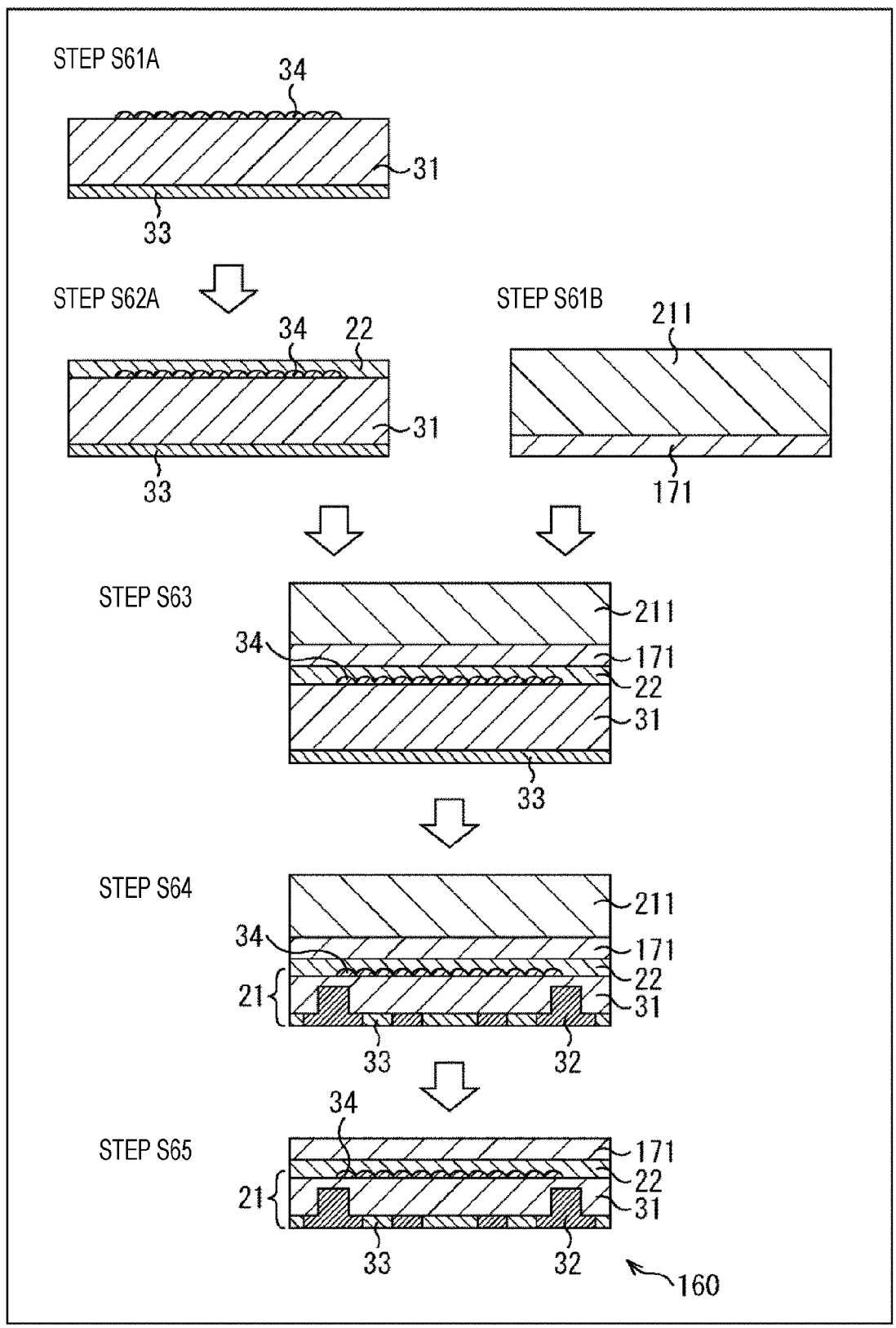
FIG. 15 is a diagram for explaining an example of a manufacturing method for a semiconductor chip.

Example of Manufacturing Method of First Configuration Example of Second Embodiment of Semiconductor Chip FIG. 15 is a diagram for illustrating an example of a manufacturing method for the semiconductor chip 160 of FIG. 11.

The entire steps of FIG. 15 are performed in a unit of a wafer-like semiconductor substrate 31 on which one or more semiconductor chips 160 are formed, but in FIG. 15, for convenience of description, only a region of one semiconductor chip 160 among one or more semiconductor chips 160 formed from the wafer-like semiconductor substrate 31 is illustrated.

Since step S61A and step S62A in FIG. 15 are similar to step S1A and step S2A in FIG. 4, the description thereof will be omitted.

Furthermore, in step S61B, a temporary bonding resin (not illustrated) is applied to the lower side of a glass substrate 211, and the cholesteric liquid crystal layer 171 is formed on the temporary bonding resin.

In step S63, the semiconductor substrate 31 and the cholesteric liquid crystal layer 171 formed in step S61B are adhered via the adhesive 22 applied to the semiconductor substrate 31 in step S62A. As a result, the cholesteric liquid crystal layer 171 is formed on the upper side (light incident side) of the solid-state imaging element 21 on which the wiring 32 is not yet formed.

Next, in step S64, the semiconductor substrate 31 is thinned, and the wiring 32 is formed on the lower side of the semiconductor substrate 31. Finally, in step S65, the glass substrate 211 is peeled off and division into individual pieces is performed to form the semiconductor chip 160.

Second Configuration Example of Second Embodiment of Semiconductor Chip

Figure 16:
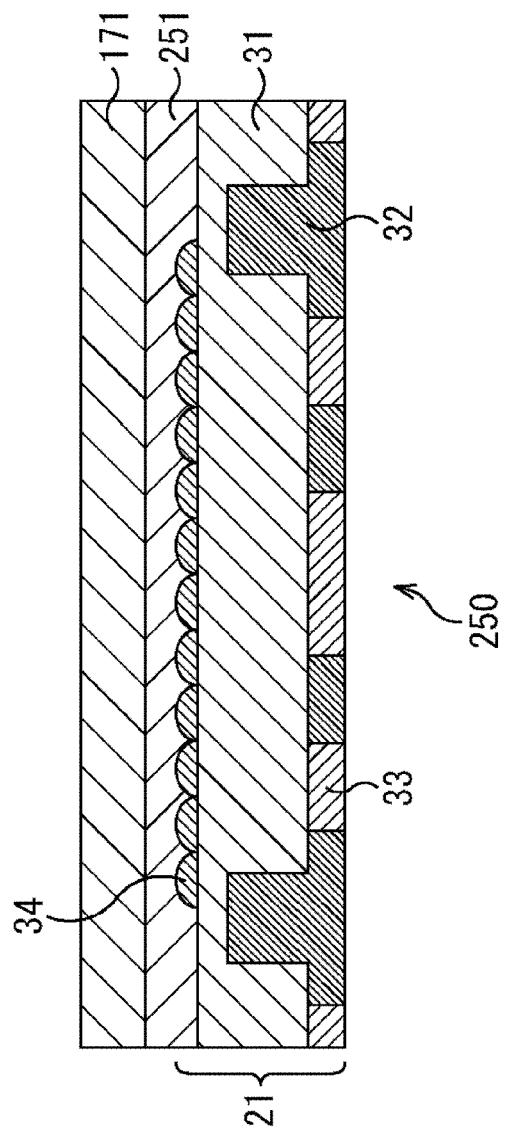
FIG. 16 is a diagram illustrating a second configuration example of the second embodiment of a semiconductor chip to which the present technology is applied.

FIG. 16 is a diagram illustrating a second configuration example of the second embodiment of the semiconductor chip to which the present technology is applied.

In FIG. 16, a portion corresponding to that in FIG. 11 is assigned with the same reference sign and the detailed description of the portion will be omitted.

As illustrated in FIG. 16, a semiconductor chip 250 is different from the semiconductor chip 160 in FIG. 11 in that a flat layer 251 is formed instead of the adhesive 22. Specifically, in the semiconductor chip 250, the flat layer 251 is formed on the upper side (light incident side) of the solid-state imaging element 21.

Note that although not illustrated, the configuration of the camera module including the semiconductor chip 250 is a configuration in which the semiconductor chip 160 of the camera module 150 in FIG. 11 is replaced with the semiconductor chip 250.

Figure 17:
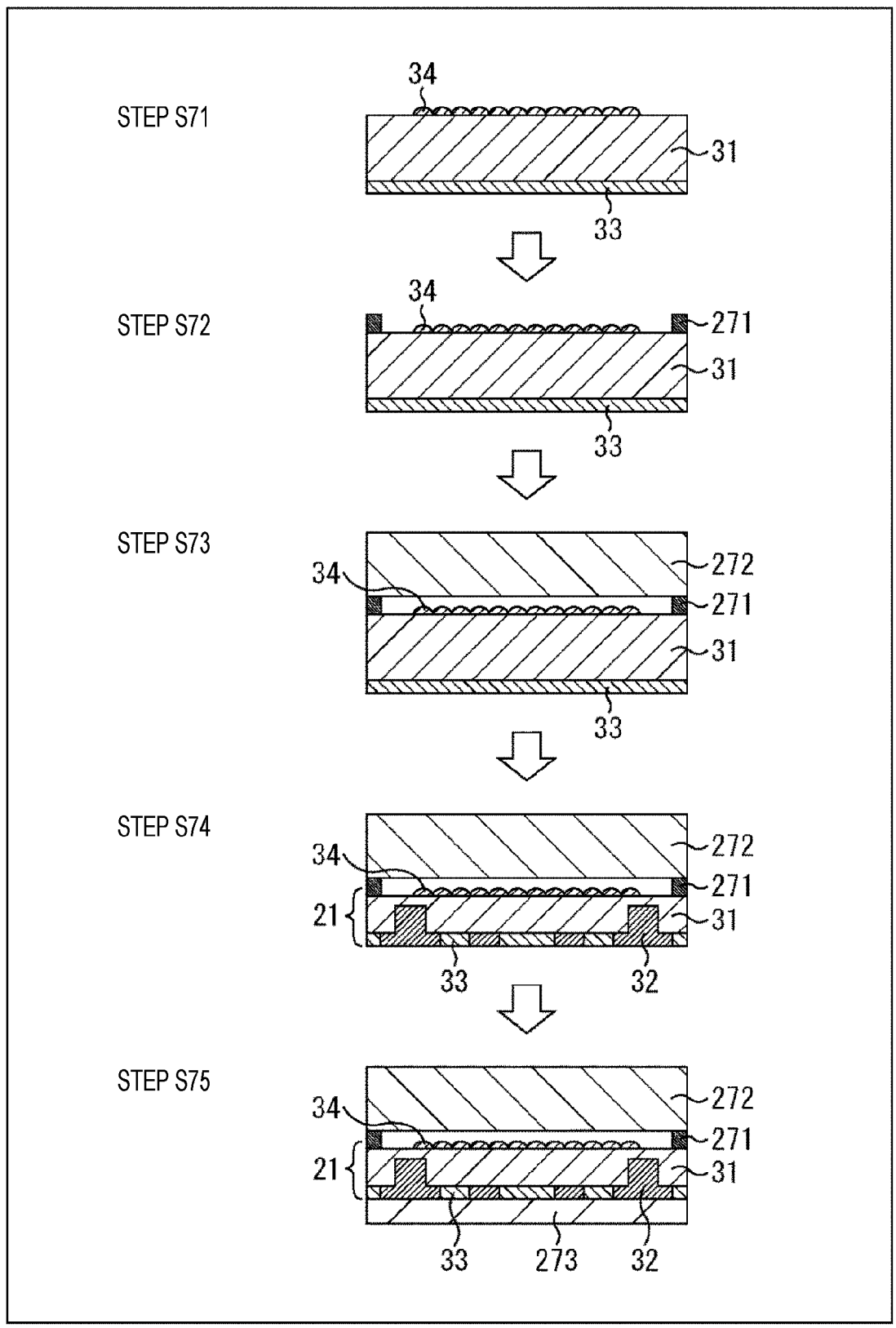
FIG. 17 is a diagram for explaining an example of a manufacturing method for a semiconductor chip.
Figure 18:
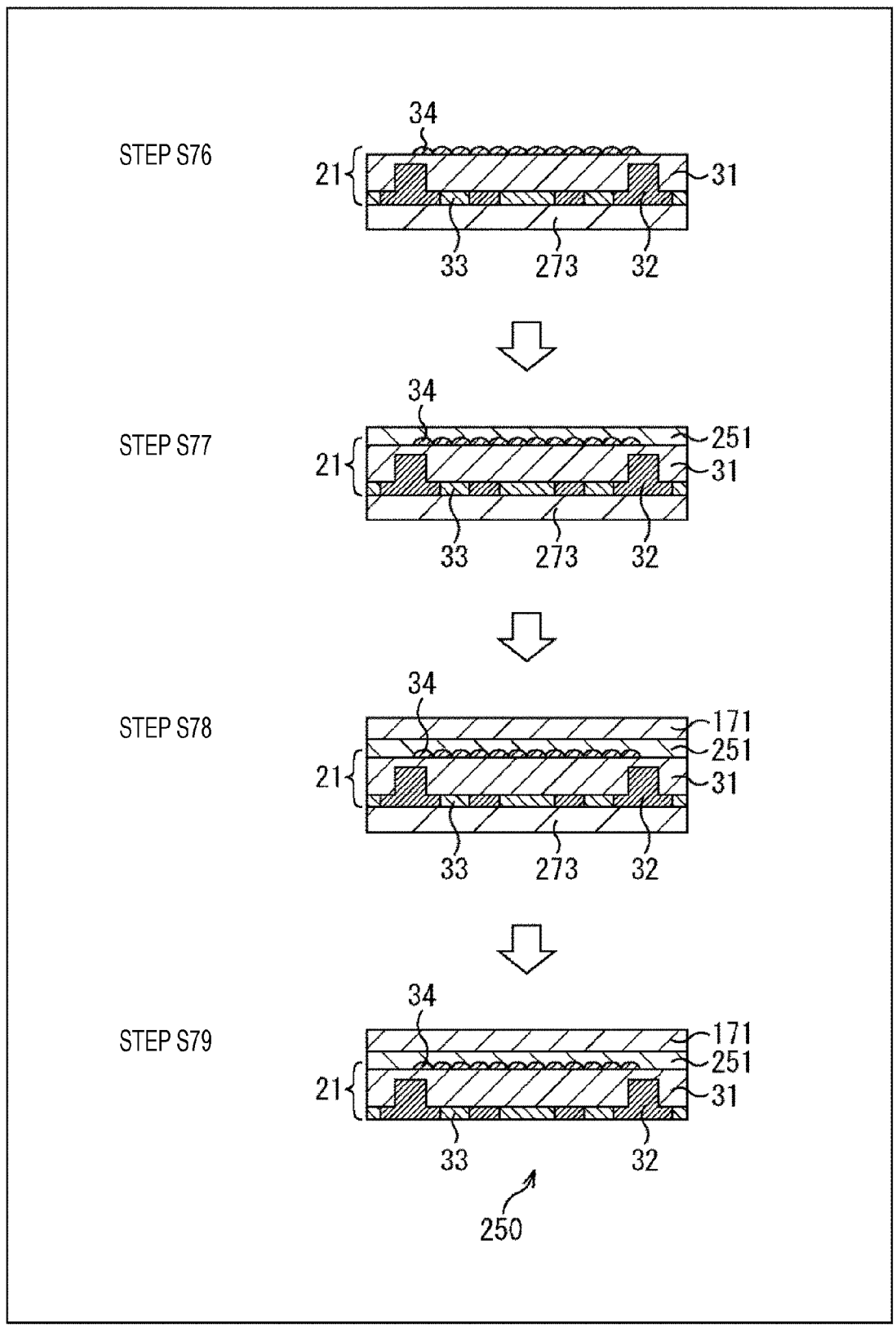
FIG. 18 is a diagram for explaining an example of a manufacturing method for a semiconductor chip.

Example of Manufacturing Method of Second Configuration Example of Second Embodiment of Semiconductor Chip FIG. 17 and FIG. 18 are diagrams for explaining an example of a manufacturing method for the semiconductor chip 250 of FIG. 16.

The entire steps of FIG. 17 and FIG. 18 are performed in a unit of a wafer-like semiconductor substrate 31 on which one or more semiconductor chips 250 are formed, but in FIG. 17 and FIG. 18, for convenience of description, only a region of one semiconductor chip 250 among one or more semiconductor chips 250 formed from the wafer-like semiconductor substrate 31 is illustrated.

In step S71 of FIG. 17, the solder resist 33 is formed on the lower side of the wafer-like semiconductor substrate 31 having the pixel region, and the solid-state imaging element 21, of which the on-chip lens 34 is formed on the upper side and on which the wiring 32 is not formed yet, is formed. Next, in step S72, a temporary bonding resin 271 is applied onto the solid-state imaging element 21 on which the wiring 32 is not yet formed.

In step S73, a glass substrate 272 is attached, via the temporary bonding resin 271, onto the solid-state imaging element 21 on which the wiring 32 is not yet formed. In step S74, the semiconductor substrate 31 is thinned, and the wiring 32 is formed on the lower side of the semiconductor substrate 31. As a result, the solid-state imaging element 21 onto which the glass substrate 272 is adhered via the temporary bonding resin 271 is formed. In step S75, a laminate tape 273 is adhered to the side of the solid-state imaging element 21 to which the glass substrate 272 is not adhered, that is, the surface on the lower side (back surface side) of the wiring 32.

In step S76 in FIG. 18, the temporary bonding resin 271 and the glass substrate 272 are peeled off. In step S77, the flat layer 251 is formed on the upper side of the solid-state imaging element 21. In step S78, the cholesteric liquid crystal layer 171 is formed on the upper side (light incident side) of the flat layer 251. Finally, in step S79, the laminate tape 273 is peeled off and division into individual pieces is performed to form the semiconductor chip 250.

As described above, the second embodiment of the semiconductor chip to which the present technology is applied includes the solid-state imaging element 21 and the cholesteric liquid crystal layer 171 provided on the light incident side with respect to the solid-state imaging element 21, and thus the image quality of the captured image can be improved.

Specifically, the cholesteric liquid crystal layer 171 suppresses transmission of light having a wavelength around 700 nm among light incident via the lens group 15 and the cover glass 14. Thus, it is possible to reduce the influence of variation in the relationship between a wavelength and transmittance of the incident light depending on the incident angle in the IR cut filter added to the cover glass 14. As a result, the occurrence of ghost, color unevenness, or the like is suppressed in an image formed by light passing through the cover glass 14, and passing through this cholesteric liquid crystal layer 171 to be incident on the solid-state imaging element 21, and the image quality is improved.

Note that in the second embodiment, only the cholesteric liquid crystal layer 171 that suppresses transmission of light having a wavelength around 700 nm is provided, but by further providing a cholesteric liquid crystal layer that suppresses transmission of light having a longer wavelength, a higher performance IR cut function can be realized.

Furthermore, in the second embodiment, it is also possible to provide a cholesteric liquid crystal layer that suppresses transmission of light in the entire wavelength band of infrared light instead of the wavelength band at the boundary between infrared light and visible light. In this case, the infrared light in the entire wavelength band may be blocked by the cholesteric liquid crystal layer without adding the IR cut filter to the cover glass 14.

Moreover, although the glass substrate is not formed on the cholesteric liquid crystal layer 171 in the second embodiment, the glass substrate may be formed.

3. Third Embodiment of Semiconductor Chip

First Configuration Example of Camera Module

Figure 19:
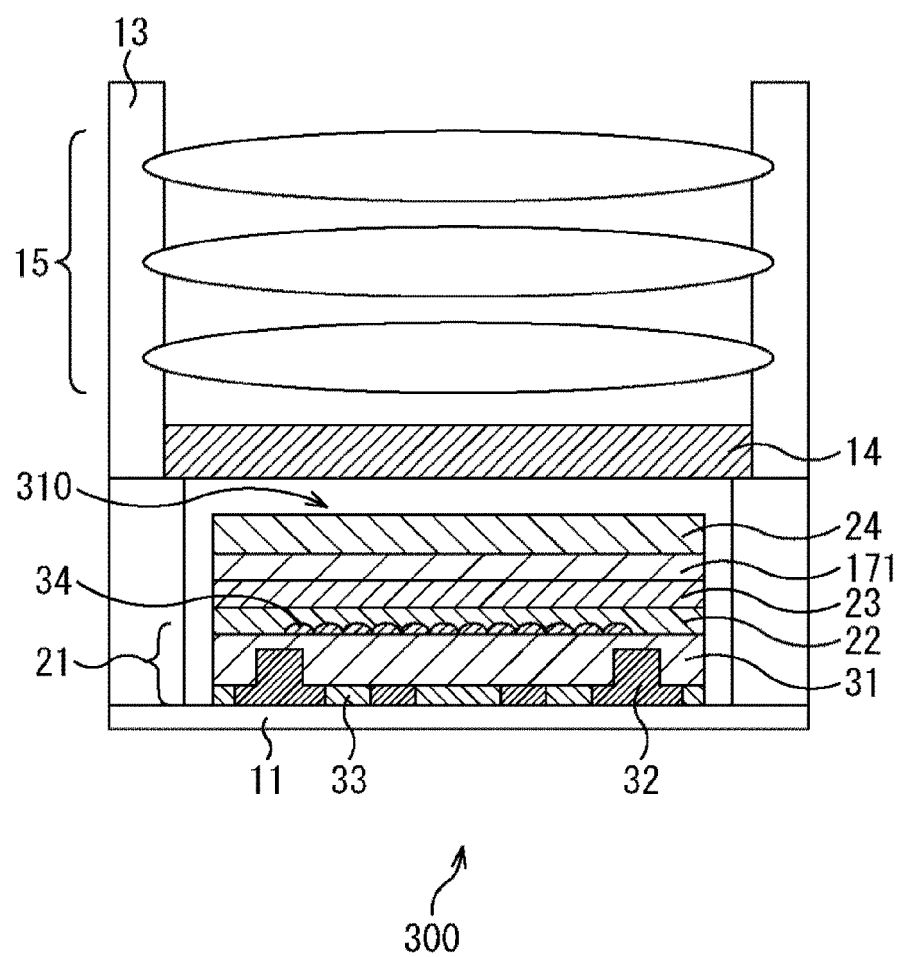
FIG. 19 is a diagram illustrating a configuration example of a camera module including a first configuration example of a third embodiment of a semiconductor chip to which the present technology is applied.

FIG. 19 is a diagram illustrating a configuration example of a camera module including a first configuration example of a third embodiment of the semiconductor chip to which the present technology is applied.

In FIG. 19, a portion corresponding to that in FIG. 1 and FIG. 11 is assigned with the same reference sign and the detailed description of the portion will be omitted.

A camera module 300 in FIG. 19 is different from the camera module 10 in FIG. 1 in that a semiconductor chip 310 is provided instead of the semiconductor chip 12. The semiconductor chip 310 is different from the semiconductor chip 12 in FIG. 1 in that both the cholesteric liquid crystal layer 23 and the cholesteric liquid crystal layer 171 are provided.

Specifically, in the semiconductor chip 310, the cholesteric liquid crystal layer 23 is provided on the upper side (light incident side) with respect to the solid-state imaging element 21. The cholesteric liquid crystal layer 171 is provided on the cholesteric liquid crystal layer 23, and the glass substrate 24 is provided on the cholesteric liquid crystal layer 171. That is, the cholesteric liquid crystal layer 23 and the cholesteric liquid crystal layer 171 are stacked between the glass substrate 24 and the solid-state imaging element 21.

Light incident on the camera module 300 is condensed by the lens group 15 and is incident on the cover glass 14. Transmission of infrared light among the light incident on the cover glass 14 is suppressed by an IR cut filter added to the cover glass 14. The light transmitted through the IR cut filter is incident on the semiconductor chip 310.

The light incident on the semiconductor chip 310 is incident on the cholesteric liquid crystal layer 171 via the glass substrate 24, and transmission of light having a wavelength around 700 nm among the light is suppressed. The light transmitted through the cholesteric liquid crystal layer 171 is incident on the solid-state imaging element 21 via the cholesteric liquid crystal layer 23 and the adhesive 22, and thus imaging is performed. Among the light incident on the solid-state imaging element 21, the light in the critical angle range reflected by the sensor surface is reflected by the lower surface of the cholesteric liquid crystal layer 23 and is incident on the vicinity of the light source on the sensor surface again.

Second Configuration Example of Camera Module

Figure 20:
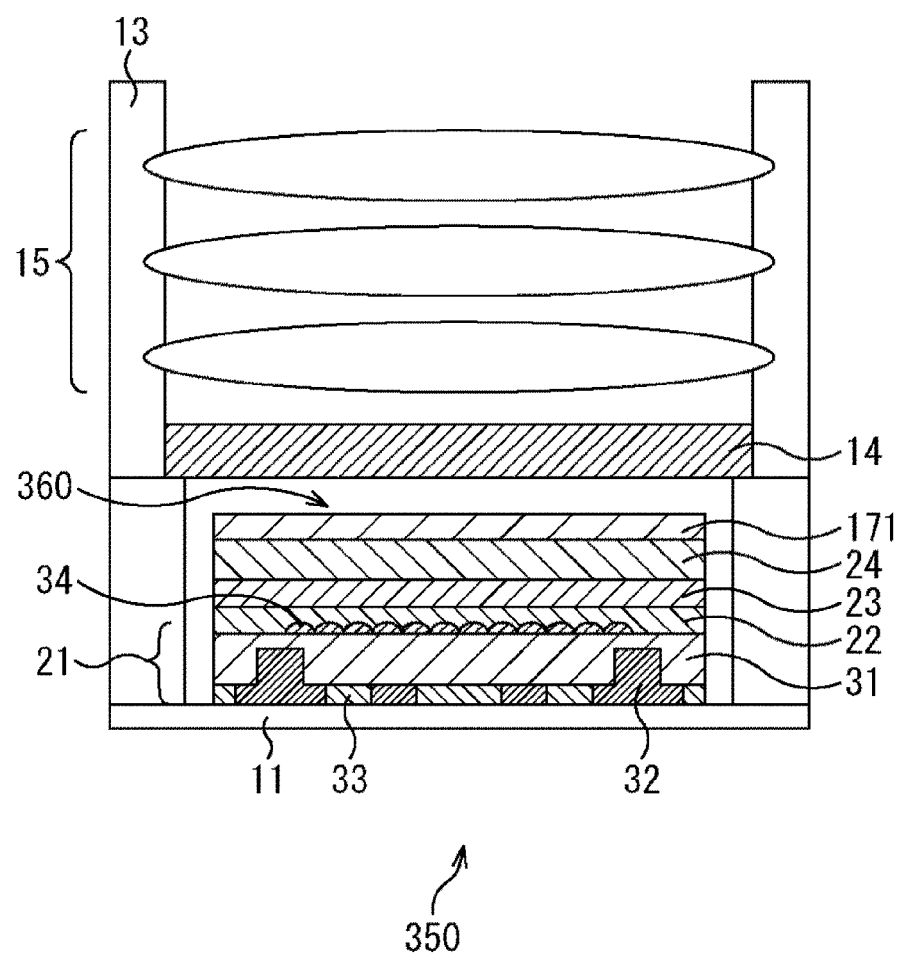
FIG. 20 is a diagram illustrating a configuration example of a camera module including a second configuration example of the third embodiment of a semiconductor chip to which the present technology is applied.

FIG. 20 is a diagram illustrating a configuration example of a camera module including a second configuration example of a third embodiment of the semiconductor chip to which the present technology is applied.

In FIG. 20, a portion corresponding to that in FIG. 19 is assigned with the same reference sign and the detailed description of the portion will be omitted.

A camera module 350 in FIG. 20 is different from the camera module 300 in FIG. 19 in that a semiconductor chip 360 is provided instead of the semiconductor chip 310 in FIG. 19. The semiconductor chip 360 is different from the semiconductor chip 310 in FIG. 19 in that the cholesteric liquid crystal layer 171 is provided on the upper side (light incident side) of the glass substrate 24. That is, in the semiconductor chip 360, the glass substrate 24 is sandwiched between the cholesteric liquid crystal layer 171 and cholesteric liquid crystal layer 23.

Light incident on the camera module 350 is condensed by the lens group 15 and is incident on the cover glass 14. Transmission of infrared light of the light incident on the cover glass 14 is suppressed by the IR cut filter added to the cover glass 14, and the light transmitted through the IR cut filter is incident on the semiconductor chip 360.

The light incident on the semiconductor chip 360 is incident on the cholesteric liquid crystal layer 171, and transmission of light having a wavelength around 700 nm among the light is suppressed. The light transmitted through the cholesteric liquid crystal layer 171 is incident on the solid-state imaging element 21 via the glass substrate 24, the cholesteric liquid crystal layer 23, and the adhesive 22, and thus imaging is performed. Among the light incident on the solid-state imaging element 21, the light in the critical angle range reflected by the sensor surface is reflected by the lower surface of the cholesteric liquid crystal layer 23 and is incident on the vicinity of the light source on the sensor surface again.

As described above, since the third embodiment of the semiconductor chip to which the present technology is applied is a combination of the first embodiment and the second embodiment, the same effects as those in the first embodiment and the second embodiment are obtained.

Note that the cholesteric liquid crystal layer 23 and the cholesteric liquid crystal layer 171 have different reflection characteristics. Specifically, the cholesteric liquid crystal layer 23 has a reflection characteristic depending on an incident angle that light in the critical angle range is reflected, but light at an angle outside the critical angle range is transmitted. However, the reflection characteristic of the cholesteric liquid crystal layer 171 does not depend on the incident angle. For example, in a case where light having a wavelength around 700 nm is incident at an angle outside the critical angle range (for example, vertically), the cholesteric liquid crystal layer 23 does not reflect the light since the light is incident at an angle outside the critical angle range. However, the cholesteric liquid crystal layer 171 has a difference in characteristic that the light is reflected since the light has a wavelength around 700 nm. The reflection described herein means that 90% or more of incident light is reflected.

Furthermore, in the first to third embodiments, the cholesteric liquid crystal layer is used to suppress transmission of light in the critical angle range or light having a wavelength around 700 nm, but any cholesteric liquid crystal layer may be used as long as the cholesteric liquid crystal layer has the same function. For example, instead of the cholesteric liquid crystal layer 171, an organic film or the like having a color element that suppresses transmission of light having a wavelength around 700 nm may be used.

Furthermore, in the first to third embodiments, the solid-state imaging element 21 is a back-illumination image sensor, but may be a front-illumination image sensor. Furthermore, the solid-state imaging element 21 may be a stacked image sensor in which a pixel region and a circuit region are formed on different substrates and are stacked.

4. Application Example to Electronic Device

The semiconductor chip 12 (80, 100, 120, 160, 250, 310, 360) described above can be applied to various electronic devices such as an imaging device such as a digital still camera and a digital video camera, a mobile phone with an imaging function, or other devices having an imaging function.

Figure 21:
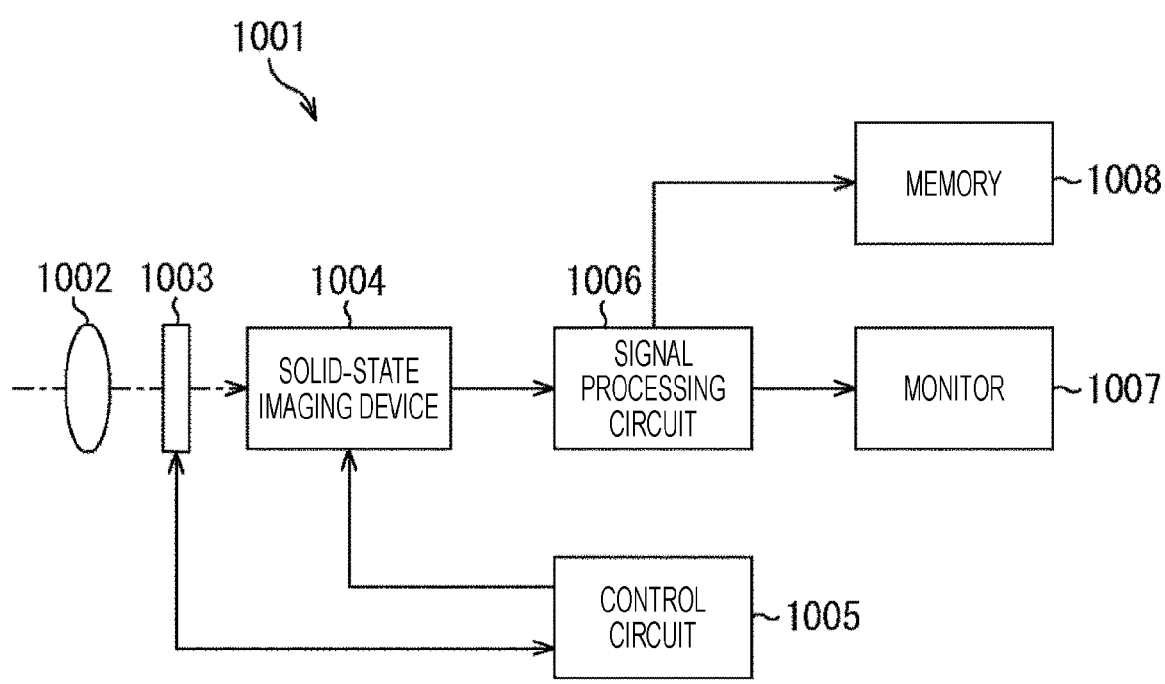
FIG. 21 is a block diagram illustrating a configuration example of an imaging device as an electronic device to which the technology of the present disclosure is applied.

FIG. 21 is a block diagram illustrating a configuration example of the imaging device as the electronic device to which the present technology is applied.

An imaging device 1001 illustrated in FIG. 21 includes an optical system 1002, a shutter device 1003, a solid-state imaging device 1004, a driving circuit 1005, a signal processing circuit 1006, a monitor 1007, and a memory 1008, and can capture a still image and a moving image.

The optical system 1002 includes one or more lenses, guides light (incident light) from a subject to the solid-state imaging device 1004, and forms an image on a light receiving surface of the solid-state imaging device 1004.

The shutter device 1003 is disposed between the optical system 1002 and the solid-state imaging device 1004, controls a light radiation period to the solid-state imaging device 1004 and a light-shielding period according to control of the driving circuit 1005.

The solid-state imaging device 1004 includes the above-described semiconductor chip 12 (80, 100, 120, 160, 250, 310, 360). The solid-state imaging device 1004 accumulates signal charge during a certain period according to the light forming an image on the light receiving surface via the optical system 1002 and the shutter device 1003. The signal charge stored in the solid-state imaging device 1004 is transferred according to a driving signal (timing signal) supplied from the driving circuit 1005.

The driving circuit 1005 outputs the driving signal for controlling transfer operation of the solid-state imaging device 1004 and shutter operation of the shutter device 1003 to drive the solid-state imaging device 1004 and the shutter device 1003.

The signal processing circuit 1006 performs various types of signal processing on the signal charge output from the solid-state imaging device 1004. The image (image data) obtained by the signal processing performed by the signal processing circuit 1006 is supplied to the monitor 1007 to be displayed or supplied to the memory 1008 to be stored (recorded).

Also in the imaging device 1001 configured as described above, the image quality of the captured image can be improved by applying the semiconductor chip 12 (80, 100, 120, 160, 250, 310, 360) as the solid-state imaging device 1004.

5. Usage Example of Semiconductor Chip

Figure 22:
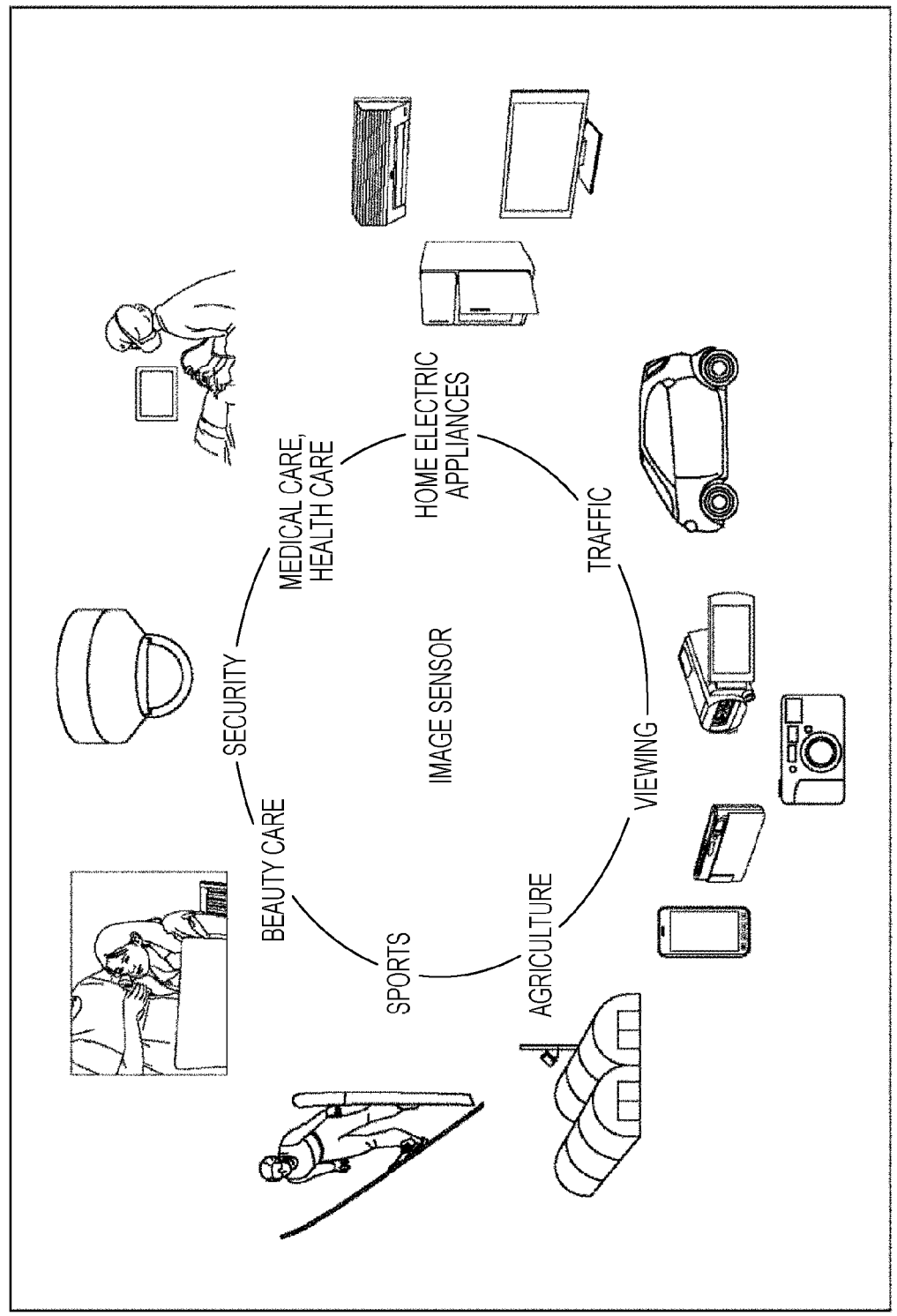
FIG. 22 is a diagram illustrating a usage example of using a semiconductor chip.

FIG. 22 is a diagram illustrating a usage example of using the above-described semiconductor chip 12 (80, 100, 120, 160, 250, 310, 360).

The above-described semiconductor chip 12 (80, 100, 120, 160, 250, 310, 360) can be used, for example, in various cases of sensing light such as visible light, infrared light, ultraviolet light, and X-ray as described below.

- A device which captures an image to be used for viewing such as a digital camera and portable equipment with a camera function
- A device used for traffic control, such as an in-vehicle sensor that captures images of the forward side, rearward side, surrounding, inside of an automobile, a monitoring camera that monitors traveling vehicles and roads, and a distance measuring sensor that measures a distance between vehicles, for safe driving such as automatic stop, recognition of a driver's condition, and the like.
- A device used for home electric appliances such as a TV, a refrigerator, and an air conditioner in order to capture an image of a gesture of a user and perform a device operation according to the gesture.
- A device used for medical care or health care, such as an endoscope or a device used for performing angiography by receiving infrared light.
- A device used for security, such as a monitoring camera for crime prevention or a camera for person authentication.
- A device used for beauty care, such as a skin measuring device for imaging skin or a microscope for imaging scalp.
- A device used for sports, such as an action camera for sports or a wearable camera for sports.
- A device used for agriculture such as a camera for monitoring conditions of fields and crops.

6. Application Example to Endoscopic Surgery System

The technology (the present technology) according to the present disclosure can be applied to various products. For example, the technology according to the present disclosure may be applied to an endoscopic surgery system.

Figure 23:
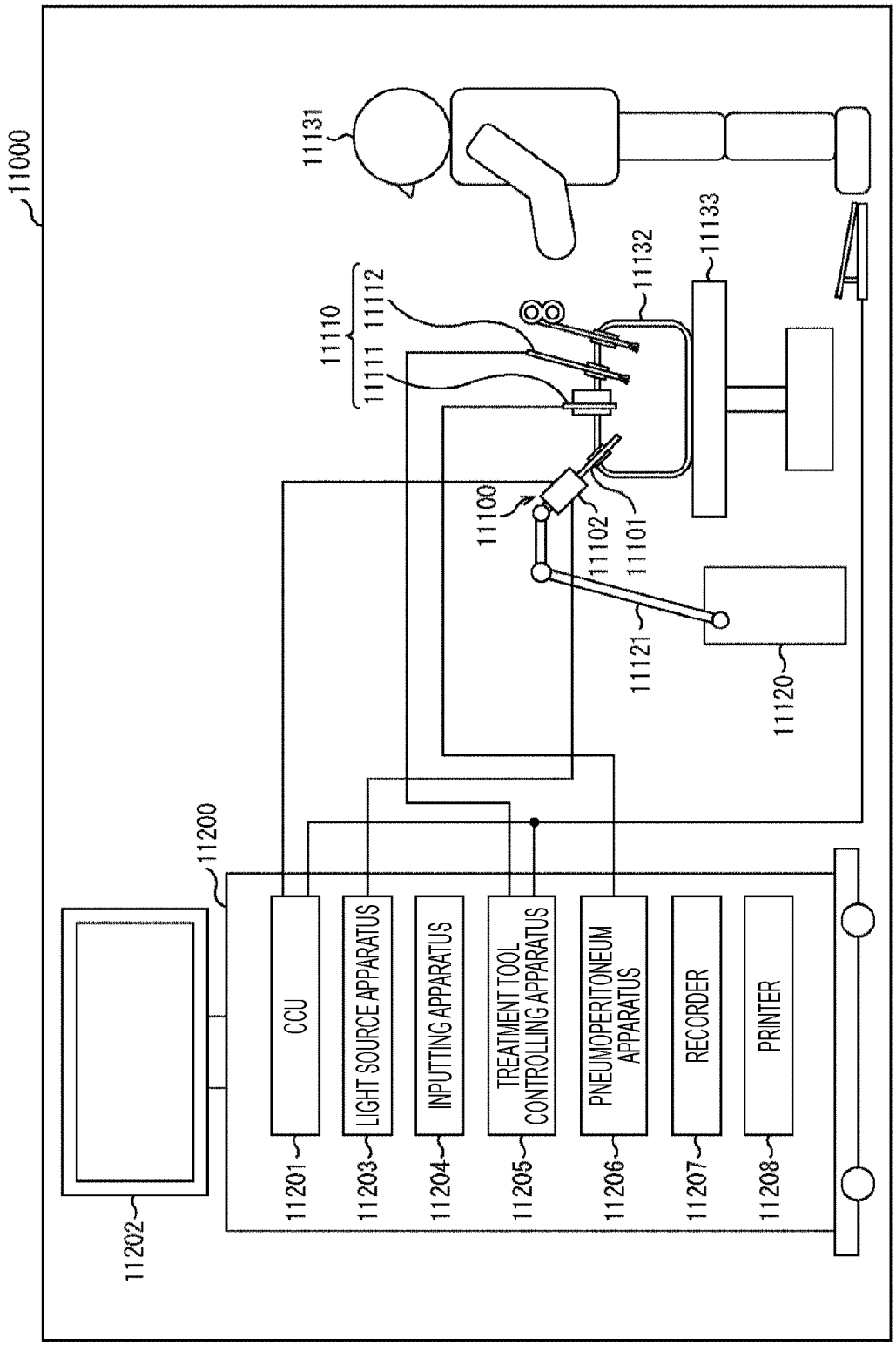
FIG. 23 is a view depicting an example of a schematic configuration of an endoscopic surgery system.

FIG. 23 is a view depicting an example of a schematic configuration of an endoscopic surgery system to which the technology according to an embodiment of the present disclosure (present technology) can be applied.

FIG. 23, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 24:
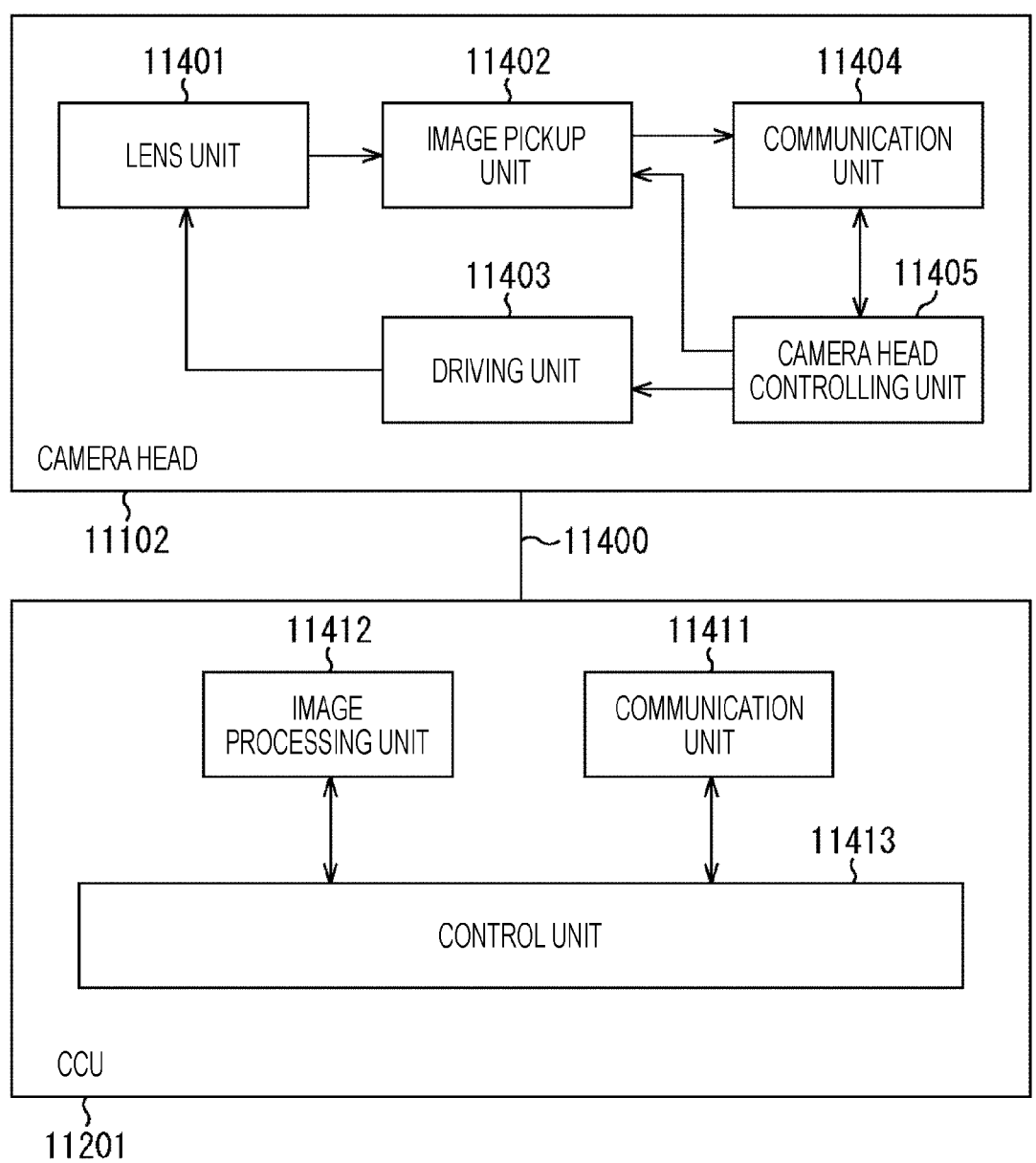
FIG. 24 is a block diagram depicting an example of a functional configuration of a camera head and a camera control unit (CCU).

FIG. 24 is a block diagram depicting an example of a functional configuration of the camera head 11102 and the CCU 11201 depicted in FIG. 23.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure can be applied has been described above. The technology according to the present disclosure can be applied to, for example, the endoscope 11100, (the imaging unit 11402 of) the camera head 11102, (the image processing unit 11412 of) the CCU 11201, and the like among the configurations described above. Specifically, for example, the semiconductor chip 12 (80, 100, 120, 160, 250, 310, 360) according to the above-described embodiment can be applied to the imaging unit 10402. By applying the technology according to the present disclosure to the imaging unit 10402, the image quality of the surgical image can be improved.

Note that here, the endoscopic surgery system has been described as an example, but the technology according to the present disclosure may be applied to, for example, a microscopic surgery system or the like.

7. Application Example to Mobile Body

The technology (the present technology) according to the present disclosure can be applied to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 25:
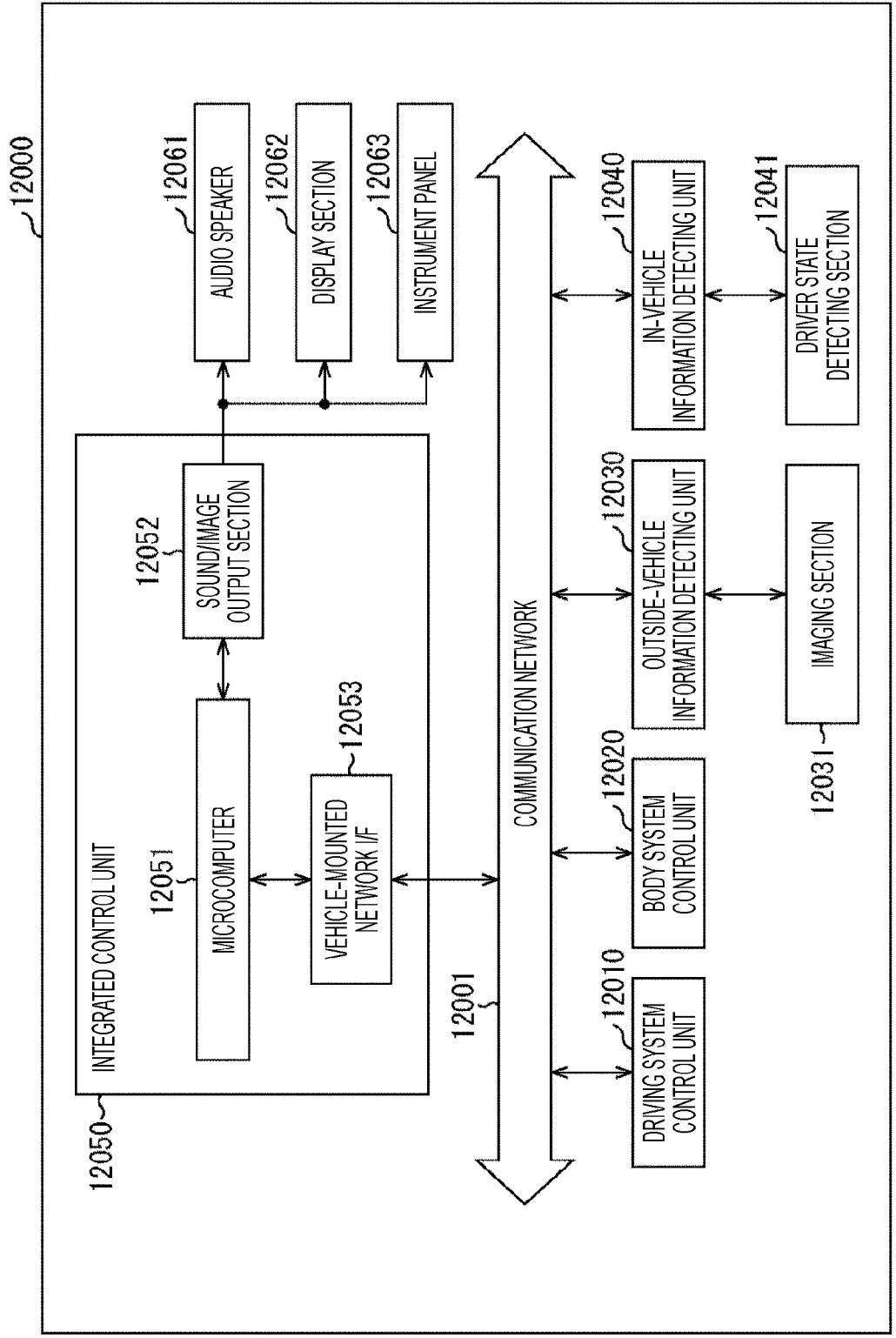
FIG. 25 is a block diagram depicting an example of schematic configuration of a vehicle control system.

FIG. 25 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 25, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 25, an audio speaker 12061, a display section 12062, and an instrument panel 12063 are illustrated as the output device. The display section 12062 may, for example, include at least one of an on-board display and a head-up display.

Figure 26:
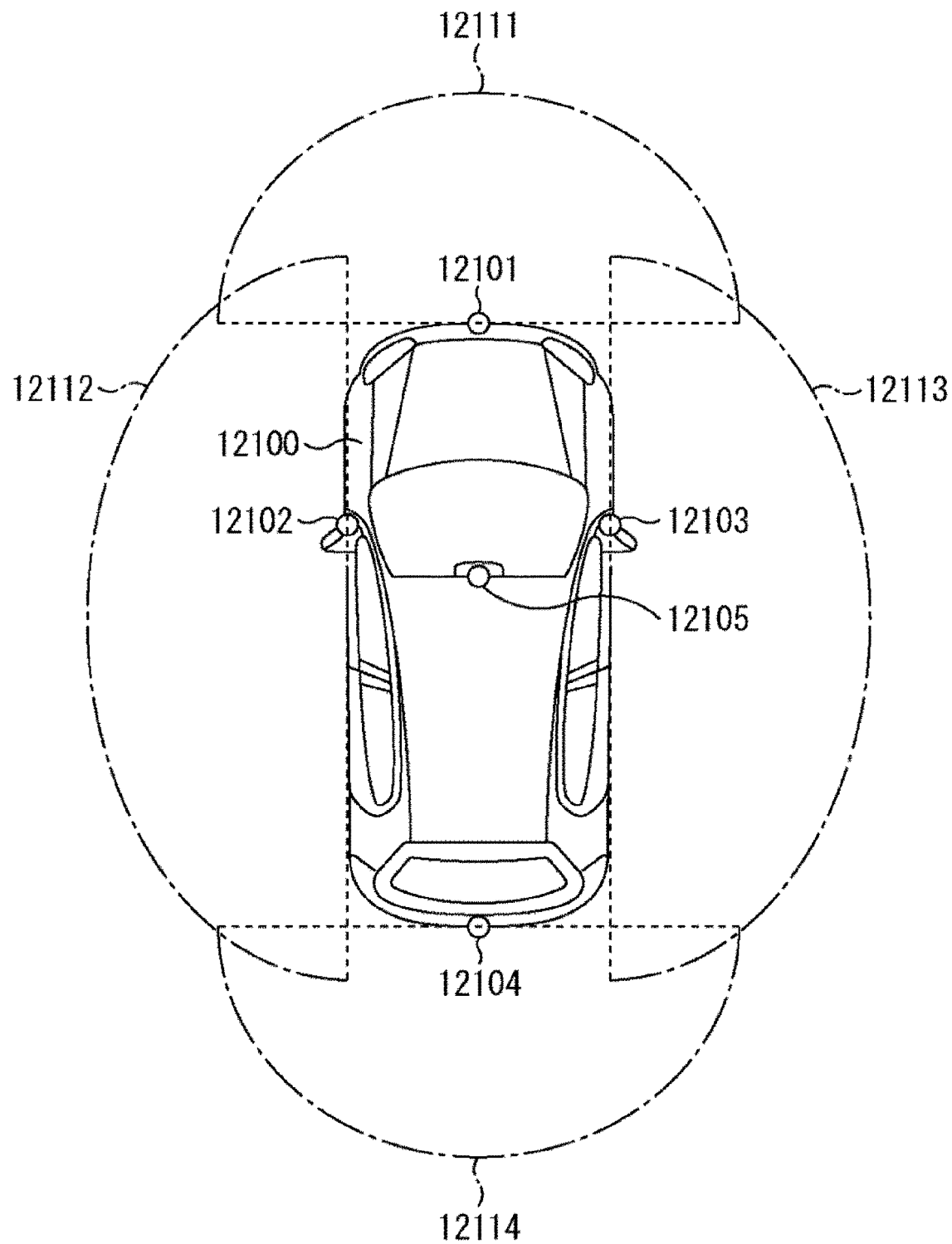
FIG. 26 is a diagram of assistance in explaining an example of installation positions of an outside-vehicle information detecting section and an imaging section.

FIG. 26 is a diagram depicting an example of the installation position of the imaging section 12031.

In FIG. 26, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure can be applied has been described above. The technology according to the present disclosure can be applied to, for example, the imaging section 12031 among the above-described configurations. Specifically, for example, the semiconductor chip 12 (80, 100, 120, 160, 250, 310, 360) according to the above-described embodiment can be applied to the imaging section 12031. By applying the technology according to the present disclosure to the imaging section 12031, the image quality of the captured image can be improved. Furthermore, it is possible to reduce driver's fatigue and increase the safety of the driver and vehicle by using the obtained high-quality captured image.

The embodiment of the present technology is not limited to the above-described embodiment, and various modifications can be made without departing from the scope of the present technology.

For example, it is possible to adopt a combination of all or some of a plurality of embodiments described above.

The effects described in the present description are merely examples and are not limited, and there may be other effects.

Note that the present technology may also have following configurations.

(1)
A semiconductor chip including:
an imaging element; and
a liquid crystal layer provided on a side from which light is incident with respect to the imaging element.

(2)
The semiconductor chip according to (1),
in which the liquid crystal layer is formed by cholesteric liquid crystal.

(3)
The semiconductor chip according to (1) or (2), further including
a glass provided on the side from which the light is incident with respect to the liquid crystal layer, in which the liquid crystal layer reflects light of which an incident angle on the glass is larger than a critical angle among the light reflected by the imaging element.

(4)
The semiconductor chip according to (3),
in which the light reflected by the liquid crystal layer is light in a range in which the incident angle on the glass ranges from the critical angle to an angle larger than the critical angle by a predetermined angle.

(5)
The semiconductor chip according to (3) or (4), further including
a light absorption layer formed along an outer periphery of the semiconductor chip and provided on the side from which the light is incident with respect to the imaging element,
in which the liquid crystal layer is formed on an inner side of the light absorption layer.

(6)
The semiconductor chip according to any one of (3) to (5), further including
another liquid crystal layer that suppress transmission of light having a predetermined wavelength among the incident light and is provided on the side from which the light is incident with respect to the imaging element.

(7)
The semiconductor chip according to (6),
in which the another liquid crystal layer is provided on the side from which the light is incident with respect to the liquid crystal layer.

(8)
The semiconductor chip according to (7),
in which the glass is provided on the side from which the light is incident with respect to the another liquid crystal layer.

(9)
The semiconductor chip according to (7),
in which the another liquid crystal layer is provided on the side from which the light is incident with respect to the glass.

(10)
The semiconductor chip according to (1) or (2),
in which the liquid crystal layer suppresses transmission of light having a predetermined wavelength among the incident light.

(11)
The semiconductor chip according to (10), further including an IR cut filter provided on the side from which the light is incident with respect to the liquid crystal layer, in which the liquid crystal layer suppresses the transmission of the light having the predetermined wavelength among the light incident through the IR cut filter.

(12)

The semiconductor chip according to (11), in which the liquid crystal layer suppresses transmission of light in a wavelength band at a boundary between infrared light and visible light among the incident light.

(13)

The semiconductor chip according to any one of (1) to (7) and (9) to (12), further including an adhesive formed along an outer periphery of the semiconductor chip between the imaging element and the liquid crystal layer, in which a space is formed on an inner side of the adhesive between the imaging element and the liquid crystal layer.

(14)

A manufacturing method for a semiconductor chip, the method including:

forming an imaging element; and forming a liquid crystal layer on a side from which light is incident with respect to the imaging element.

(15)

The manufacturing method for a semiconductor chip according to (14), further including:

forming the liquid crystal layer on a glass; and adhering the imaging element to the liquid crystal layer.

(16)

The manufacturing method for a semiconductor chip according to (15), further including peeling off the glass.

(17)

The manufacturing method for a semiconductor chip according to (14), further including:

applying an adhesive on the imaging element;

forming the liquid crystal layer on the adhesive; and adhering a glass onto the liquid crystal layer.

(18)

The manufacturing method for a semiconductor chip according to (14), further including:

forming a flat layer on the imaging element;

forming a spacer along an outer periphery of the semiconductor chip on the flat layer;

dropping liquid crystal for forming the liquid crystal layer on an inner side of the spacer on the flat layer; and adhering a glass to the spacer to form the liquid crystal layer between the glass and the flat layer.

(19)

The manufacturing method for a semiconductor chip according to (14), further including:

applying a resin onto the imaging element;

adhering a glass onto the imaging element via the resin, adhering a laminate tape to a surface of the imaging element on a side to which the glass is not adhered;

peeling off the resin and the glass;

forming a flat layer on the imaging element;

forming the liquid crystal layer on the flat layer; and peeling off the laminate tape.

(20)

An electronic device including:

a semiconductor chip including an imaging element, and a liquid crystal layer provided on a side from which light is incident with respect to the imaging element; and a signal processing circuit configured to process a signal from the semiconductor chip.

REFERENCE SIGNS LIST

12 Semiconductor chip
14 Cover glass
21 Solid-state imaging element
22 Adhesive
23 Cholesteric liquid crystal layer
24 Glass substrate
80 Semiconductor chip
81 Flat layer
82 Spacer
91 Cholesteric liquid crystal
100 Semiconductor chip
101 Light absorption layer
120 Semiconductor chip
121 Adhesive
122 Space
160 Semiconductor chip
171 Cholesteric liquid crystal layer
191 Semiconductor chip
211 Glass substrate
250 Semiconductor chip
251 Flat layer
271 Resin
272 Glass substrate
273 Laminate tape
310, 360 Semiconductor chip
1001 Imaging device
1006 Signal processing circuit

The invention claimed is:

1. A semiconductor chip, comprising:

an imaging element;

a first liquid crystal layer on a side of the imaging element from which first light is incident;

a light absorption layer along a first outer periphery of the semiconductor chip, wherein the light absorption layer is on the side of the imaging element from which the first light is incident, and the first liquid crystal layer is on an inner side of the light absorption layer; and a glass on a side of the first liquid crystal layer from which the first light is incident.

2. The semiconductor chip according to claim 1, wherein the first liquid crystal layer includes cholesteric liquid crystal.

3. The semiconductor chip according to claim 1, wherein the imaging element is configured to reflect second light, the first liquid crystal layer is configured to reflect specific light of the second light reflected by the imaging element, and the specific light of the second light has an incident angle on the glass larger than a critical angle.

4. The semiconductor chip according to claim 3, wherein the specific light reflected by the first liquid crystal layer is light in a range in which the incident angle on the glass ranges from the critical angle to an angle larger than the critical angle by a specific angle.

5. The semiconductor chip according to claim 3, further comprising a second liquid crystal layer configured to suppress a transmission of specific light of the first light, wherein the specific light of the first light has specific wavelength, and the second liquid crystal layer is on the side of the imaging element from which the first light is incident.

6. The semiconductor chip according to claim 5, wherein the second liquid crystal layer is on the side of the first liquid crystal layer from which the first light is incident.

7. The semiconductor chip according to claim 6, wherein the glass is on a side of the second liquid crystal layer from which the first light is incident.

8. The semiconductor chip according to claim 6, wherein the second liquid crystal layer is provided on a side of the glass from which the first light is incident.

9. The semiconductor chip according to claim 1, wherein the first liquid crystal layer is configured to suppress a first transmission of specific light of the first light, and the specific light of the first light has specific wavelength.

10. The semiconductor chip according to claim 9, further comprising an IR cut filter on the side of the first liquid crystal layer from which the first light is incident, wherein the first liquid crystal layer is further configured to suppress the first transmission of the specific light having the specific wavelength through the IR cut filter.

11. The semiconductor chip according to claim 10, wherein the first liquid crystal layer is further configured to suppress a second transmission of light of the first light in a wavelength band at a boundary between infrared light and visible light.

12. The semiconductor chip according to claim 1, further comprising an adhesive along a second outer periphery of the semiconductor chip between the imaging element and the first liquid crystal layer,
wherein an inner side of the adhesive between the imaging element and the first liquid crystal layer includes a space.

13. An electronic device, comprising:
a semiconductor chip including:
an imaging element;
a liquid crystal layer on a side of the imaging element from which light is incident;
a light absorption layer along an outer periphery of the semiconductor chip, wherein
the light absorption layer is on the side of the imaging element from which the light is incident, and
the liquid crystal layer is on an inner side of the light absorption layer; and
a glass on a side of the liquid crystal layer from which the light is incident; and
a signal processing circuit configured to process a signal from the semiconductor chip.

* * * * *